United States Patent
Imai

(10) Patent No.: US 9,283,771 B2
(45) Date of Patent: Mar. 15, 2016

(54) METHOD OF MANUFACTURING PRINT HEAD, PRINT HEAD AND IMAGE FORMING APPARATUS, USING LIGHT DENSITY DATA FOR PRINT HEAD CORRECTION

(71) Applicant: Shigeaki Imai, Kanagawa (JP)

(72) Inventor: Shigeaki Imai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/598,800

(22) Filed: Jan. 16, 2015

(65) Prior Publication Data
US 2015/0202887 A1 Jul. 23, 2015

(30) Foreign Application Priority Data
Jan. 21, 2014 (JP) .................................. 2014-008957

(51) Int. Cl.
 *B41J 2/47* (2006.01)
 *G01J 1/44* (2006.01)
 *G01J 1/16* (2006.01)
 *B41J 2/447* (2006.01)
(52) U.S. Cl.
 CPC .. *B41J 2/47* (2013.01); *B41J 2/447* (2013.01); *G01J 1/16* (2013.01); *G01J 2001/161* (2013.01)
(58) Field of Classification Search
 CPC ......... G01J 1/16; G01J 2001/161; B41J 2/47; B41J 2/447
 USPC ....................... 347/225, 236, 224; 250/214 C
 See application file for complete search history.

(56) References Cited

U.S. PATENT DOCUMENTS

| 6,292,206 | B1 | 9/2001 | Takehara et al. |
| 8,964,240 | B2 | 2/2015 | Imai |
| 2002/0051052 | A1* | 5/2002 | Masuda et al. ................ 347/236 |
| 2005/0094234 | A1 | 5/2005 | Miyatake et al. |
| 2007/0058255 | A1 | 3/2007 | Imai et al. |
| 2007/0146849 | A1 | 6/2007 | Miyatake et al. |
| 2007/0236557 | A1 | 10/2007 | Imai et al. |
| 2008/0019255 | A1 | 1/2008 | Imai et al. |
| 2008/0068678 | A1 | 3/2008 | Suzuki et al. |
| 2008/0170283 | A1 | 7/2008 | Imai |
| 2008/0192323 | A1 | 8/2008 | Nakamura et al. |
| 2008/0259426 | A1 | 10/2008 | Imai |
| 2009/0058979 | A1 | 3/2009 | Saisho et al. |

(Continued)

FOREIGN PATENT DOCUMENTS

| JP | 11-227254 | 8/1999 |
| JP | 11-342650 | 12/1999 |

(Continued)

*Primary Examiner* — Julian Huffman
*Assistant Examiner* — Carlos A Martinez
(74) *Attorney, Agent, or Firm* — Oblon, McClelland, Maier & Neustadt, L.L.P.

(57) ABSTRACT

A method of manufacturing a print head includes a first step of finding first light quantity related data showing a light quantity in a light spot formed by lighting up each of light-emitting units by a driving unit by using a first threshold, a second step of finding first magnitude related data showing a magnitude in the light spot formed by lighting up the light-emitting unit by the driving unit by using a second threshold, a third step of finding first ratio data showing a ratio between the first light quantity related data and the first magnitude related data, a fourth step of finding light quantity correction data to the light-emitting unit forming the light spot as a target by using the first ratio data, and a fifth step of retaining the found light quantity correction data to the print head.

10 Claims, 12 Drawing Sheets

(56) References Cited

U.S. PATENT DOCUMENTS

| | | |
|---|---|---|
| 2009/0073529 A1 | 3/2009 | Imai |
| 2009/0073531 A1 | 3/2009 | Imai |
| 2009/0074437 A1 | 3/2009 | Tanabe et al. |
| 2009/0225385 A1 | 9/2009 | Imai |
| 2009/0231654 A1 | 9/2009 | Imai |
| 2010/0310284 A1 | 12/2010 | Funato et al. |
| 2011/0102536 A1* | 5/2011 | Imai .............................. 347/224 |
| 2012/0027450 A1 | 2/2012 | Imai |

FOREIGN PATENT DOCUMENTS

| | | |
|---|---|---|
| JP | 2001-270146 | 10/2001 |
| JP | 2001-322310 | 11/2001 |
| JP | 2002-370401 | 12/2002 |

* cited by examiner

METHOD OF MANUFACTURING PRINT HEAD, PRINT HEAD AND IMAGE FORMING APPARATUS, USING LIGHT DENSITY DATA FOR PRINT HEAD CORRECTION

CROSS-REFERENCE TO RELATED APPLICATION

This application claims priority under 35 USC 119 from Japanese Patent Application No. 2014-8957 filed on Jan. 21, 2014, the disclosure of which is incorporated by reference herein.

BACKGROUND OF THE INVENTION

1. Field of the Invention

The present invention relates to a method of manufacturing a print head used in an image forming apparatus, the print head, and an image forming apparatus provided with the print head.

2. Description of the Related Art

For laser printers or copiers, it is known to use a print head adopting an LED array or an organic EL array as a light source, and a rod lens array, as an exposure device. This print head can be sized to be extremely smaller as compared to an exposure device of a system using a semiconductor laser and a polygon scanner. Therefore it is possible to downsize the laser printer or copier.

Incidentally in the print head, one light source in the print head is associated with one dot of an image individually (for example, one-to-one) to perform image formation, but there occur variations in characteristic of each of the light sources, for example, due to manufacturing errors. Then, in the print head, the variations in characteristic of each of the light sources give an adverse influence on each dot in the formed image to generate a longitudinal streak (density unevenness) in the formed image. Therefore, the print head is configured such that each of the light sources is driven by using light quantity correction data (light quantity correction value) to each of the light sources to appropriately adjust the light quantity of each of the light sources, thus preventing the generation of the longitudinal streak.

A method of correcting the light quantity of a light write head is considered as a method of generating the light quantity correction data in such a print head (for example, refer to Japanese Patent Laid-Open No. 2001-270146). According to this light quantity correction method, a third correction coefficient row is found based upon a first correction coefficient row in a case of correcting optical output in such a manner that a diameter of a light spot is uniform and a second correction coefficient row in a case of correcting the optical output in such a manner that optical output of a luminous point is uniform, to make the image density uniform. In consequence, in the print head to which this light quantity correction method is applied, the optical output of each of the light sources is corrected by the found third correction coefficient row, thus making it possible to prevent the variations in image density of the formed image.

In regard to another method of generating the light quantity correction data in the print head, there is disclosed a method of measuring characteristic points (light quantity, luminous diameter, and luminous area) in the luminous intensity to determine light quantity correction data of adjusting the light quantity of each of the light sources, based upon the characteristic points (for example, refer to Japanese Patent Laid-Open No. 11-227254).

Besides, there is disclosed a method of correcting the light quantity of each of the light sources in such a manner that an area exceeding a predetermined threshold from a point of view of the luminous intensity is constant in the print head (for example, refer to Japanese Patent Laid-Open No. 2002-370401).

Besides, there is disclosed a method of correcting the light quantity of each of the light sources in such a manner that the light amount exceeding a predetermined threshold in a beam profile of each of the light sources is constant in the print head (for example, refer to Japanese Patent Laid-Open No. 11-342650).

Besides, there is disclosed a method of producing light quantity correction data to adjust the light quantity of each of the light sources in such a manner that a cross-sectional area in any luminous intensity in a beam profile of each of the light sources is within a desired distribution in the print head (for example, refer to Japanese Patent Laid-Open No. 2001-322310).

In this manner, according to the conventional print head, each of the light sources is driven by using the light quantity correction data produced in such a manner that the light quantity, the luminous diameter or the luminous area in each of the light sources becomes a constant value or approaches the constant value.

The conventional print head, however, can suppress the generation of the longitudinal streak in the formed image, and cannot sufficiently prevent the generation of the longitudinal streak. Therefore the print head that drives each of the light sources by using the above-mentioned light quantity correction data has room for improvement from a point of view of appropriately preventing the generation of the longitudinal streak.

SUMMARY OF THE INVENTION

The present invention is made in view of the foregoing problems in the conventional print head, and an object of the present invention is to provide a method of manufacturing a print head that can appropriately prevent generation of a longitudinal streak.

To achieve the above-mentioned object, there is provided a method of manufacturing a print head according to an aspect of the present invention, which includes a substrate on which a plurality of light-emitting units are provided to be arrayed, and a driving unit that drives each of the light-emitting units, wherein a light spot is formed on a field by each of the light-emitting units, including a first step of finding first light quantity related data showing the light quantity in the light spot formed by lighting the light-emitting unit by the driving unit by using a first threshold, a second step of finding first magnitude related data showing the magnitude in the light spot formed by lighting the light-emitting unit by the driving unit by using a second threshold, a third step of finding first ratio data showing a ratio between the first light quantity related data and the first magnitude related data, a fourth step of finding light quantity correction data to the light-emitting unit forming the light spot as a target by using the first ratio data, and a fifth step of retaining the found light quantity correction data to the print head.

In the method of manufacturing the print head according to the aspect of the present invention, it is possible to manufacture the print head that can appropriately prevent the generation of the longitudinal streak.

DETAILED DESCRIPTION OF THE PREFERRED EMBODIMENTS

Embodiments of a method of manufacturing a print head used, a print head manufactured by this method, and an image forming apparatus provided with the print head according to the present invention will be explained with reference to the accompanying drawings. It will be apparent to those skilled in the art from this disclosure that the following description of the embodiments of the present invention are provided for illustration only, and not for the purpose of limiting the invention as defined by the appended claims and their equivalents.

First Embodiment

A method of manufacturing a print head according to a first embodiment will be explained hereinafter with reference to FIG. 1 to FIG. 12, as an example of a method of manufacturing a print head according to the present invention. Together with it, a print head 30 as an example of a print head manufactured by the method of manufacturing the print head, and an image forming apparatus 10 as an example of an image forming apparatus provided with the print head 30 will be explained. It should be noted that in FIG. 2, for easy understanding of the configuration of the print head 30, a housing 33 is omitted in illustration, and there is shown schematically a state of irradiating a charging face of a photoconductor 11 with light.

Figure 1:
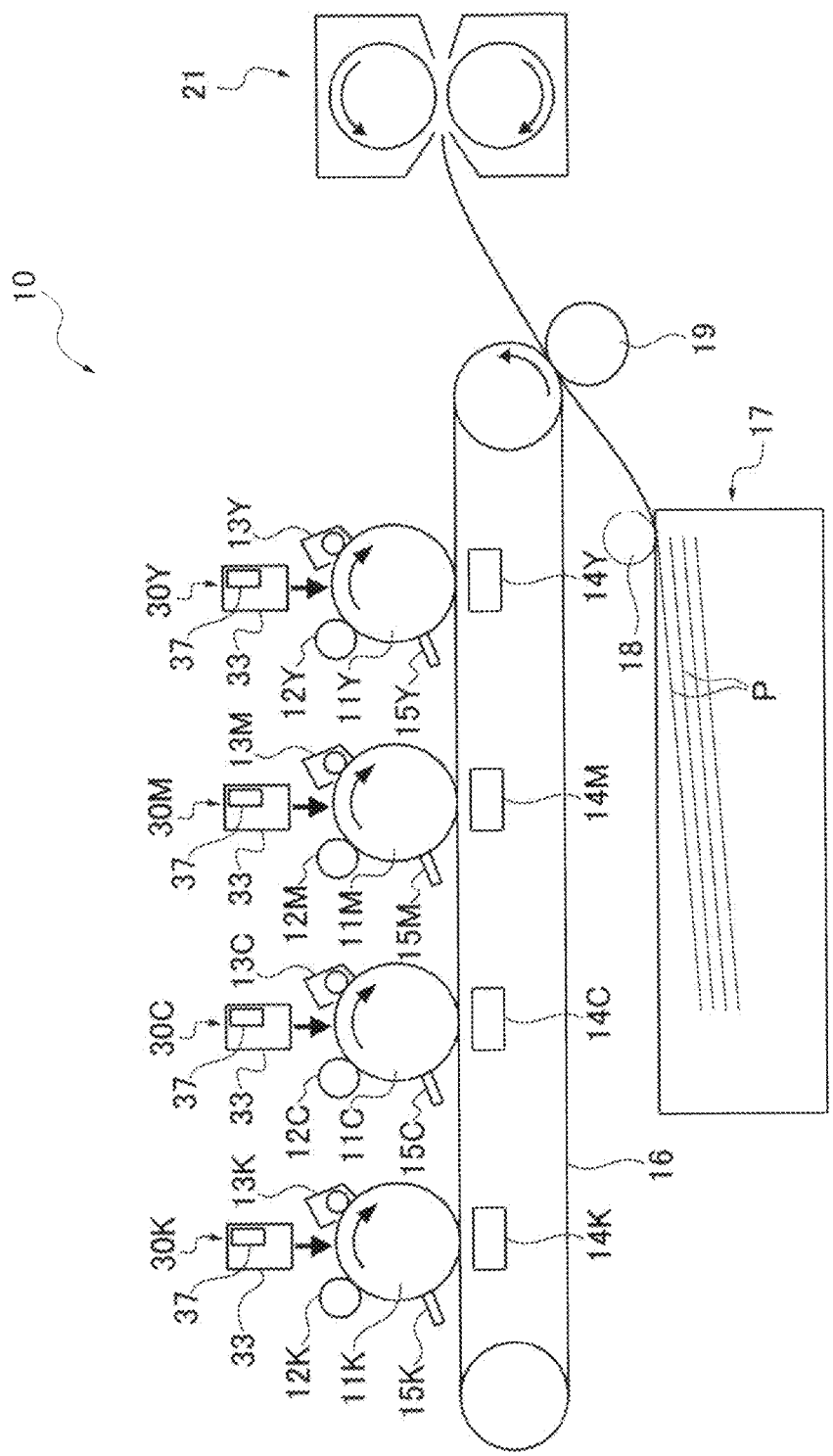
FIG. 1 is a schematic cross section showing an image forming apparatus provided with a print head manufactured by a method of manufacturing a print head according to a first embodiment of the present invention.

FIG. 1 is a schematic cross section showing the image forming apparatus 10 on which the print head 30 manufactured by the method of manufacturing the print head according to the first embodiment is mounted. The image forming apparatus 10 is, as shown in FIG. 1, a multicolor printer of a tandem system that forms an image of a full color by superimposing four colors of black (K), yellow (Y), magenta (M), and cyan (C). The image forming apparatus 10 includes the photoconductors 11 as image bearers, charging devices 12, the print heads 30, developing devices 13, transfer charging mechanisms 14, and cleaning mechanisms 15 respectively for the four colors. It should be noted that the configuration provided for each of the four colors is shown with a sign (K, Y, M, or C) showing each color attached at the ending of each numeral in FIG. 1. In addition, the image forming apparatus 10 includes a transfer belt 16, a sheet feeding tray 17, a sheet feeding roller 18, a transfer roller 19, and a fixing device 21, which are in common to the four colors.

Each of the photoconductors 11 is rotated in a clockwise direction in a front view of FIG. 1 as needed. The charging device 12, the print head 30, the developing device 13, the transfer charging mechanism 14, and the cleaning mechanism 15 are provided in that order in the rotation direction of each of the photoconductors 11. In addition, the transfer belt 16 that bridges over in an array direction of them is provided to be able to circle in a direction equal to the rotation direction of each of the photoconductors 11 under each of the photoconductors 11.

Each of the charging devices 12 is a charging device uniformly charging a surface of the corresponding photoconductor 11. Each of the print heads 30 emits light onto the charging face of the corresponding photoconductor 11 (forms each of light spots SP) to form an electrostatic latent image corresponding to an image of the corresponding color on the surface of the photoconductor 11. Each of the developing devices 13 supplies toner of the corresponding color to the surface of the photoconductor 11 to make the electrostatic latent image formed on the surface of the photoconductor 11 a visible image (explicit image) as a toner image of the corresponding color. Each of the transfer charging mechanisms 14 is provided to face the corresponding photoconductor 11 through the transfer belt 16, and transfers the toner image of the corresponding color formed on the surface of the photoconductor 11 on the transfer belt 16. At this time, the transfer belt 16 has a circling speed set corresponding to a rotation speed of each of the photoconductors 11, and the toner images of the respective colors formed respectively on the photoconductors 11 are appropriately superimposed on the transfer belt 16. In addition, in each of the photoconductors 11, the toner left on the surface thereof without transferring on the transfer belt 16 is removed by the cleaning mechanism 15.

On the other hand, recording mediums P each, for example, made of a transfer sheet are accumulated in the sheet feeding tray 17 arranged under the photoconductor 11. The recording medium P at the highest position is fed between the transfer roller 19 and the transfer belt 16 by rotation of the sheet feeding roller 18 from the sheet feeding tray 17. When the recording medium P passes between the transfer roller and the transfer belt, the toner images of the respective colors that have been superimposed on the transfer belt 16 are transferred together on the recording medium P. Therefore, the transfer roller 19 functions as a transfer mechanism that cooperates with the transfer belt 16 to transfer the image made to a visible image on the photoconductor 11 as the image bearer, on the recording medium P. When the recording medium P on which the toner image has transferred is conveyed and passes through the fixing device 12, the transferred tonner image is fixed thereon. Thereby, in the image forming apparatus 10, an image of a full color can be formed on the recording medium P to output the recording medium P on which the image of the full color is formed.

The print head 30 includes a substrate 31 and a lens array 32, which are supported in a housing 33 (refer to FIG. 1). The substrate 31 is provided with a plurality of light sources such as LEDs or organic ELs lined up (arrayed) in line thereon, and in the first embodiment, a plurality of LED array chips 34 are arrayed in line thereon. The LED array chip 34 is configured of a plurality of LEDs 35 (light-emitting diodes) that are lined up (arrayed) in line along a direction where the LED array chips 34 are arrayed. Therefore the respective LEDs 35 function as light-emitting units that are provided to be arrayed on the substrate 31. In the print head 30, the number of the respective LED array chips 34 (the respective LEDs 35) is set such that the LED 35 as one light source should be associated individually (for example, one-to-one) with one dot of the image (electrostatic latent image) to be formed.

Figure 2:
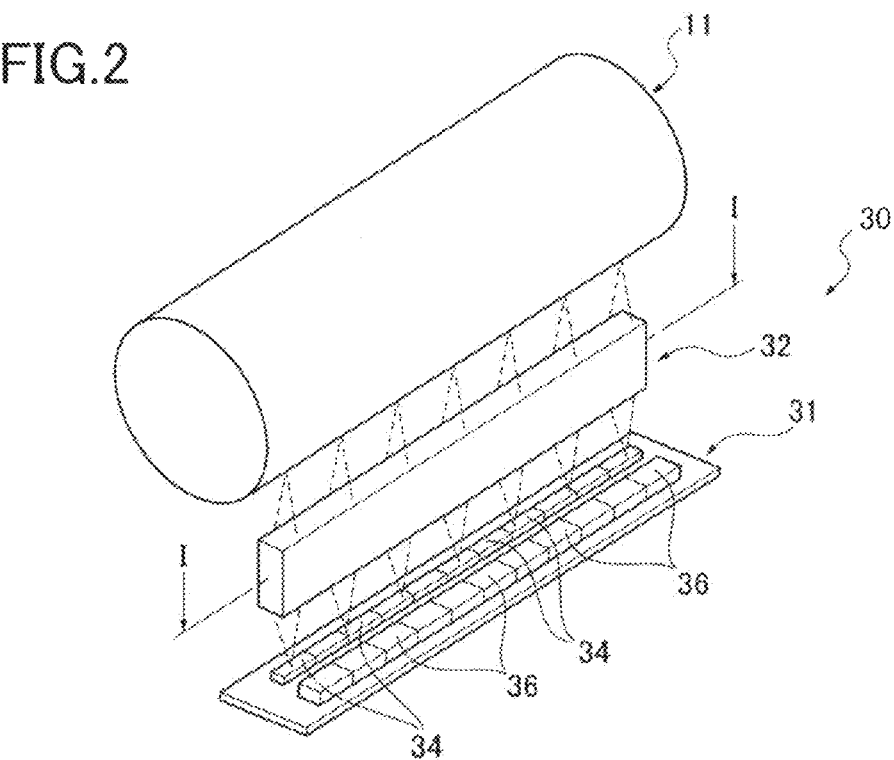
FIG. 2 is a perspective view schematically showing the configuration of the print head according to the first embodiment.
Figure 3:
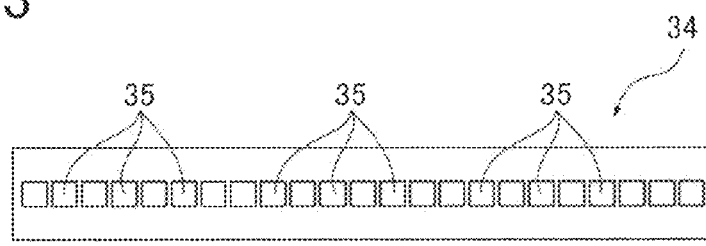
FIG. 3 is a front view schematically showing the configuration of an LED array chip according to the first embodiment.

In addition, the substrate 31 is, as shown in FIG. 2, provided with a plurality of driver ICs 36 thereon. Each of the driver ICs 36 is provided to drive (light on/off) a light source out of a plurality of light sources provided on the substrate 31, that is, the corresponding one out of the respective LEDs 35 in each of the LED array chips 34. Each of the driver ICs 36 drives each of the LEDs 35 in each of the LED array chips 34 corresponding to the image to be formed, based upon control by a control unit in the image forming apparatus 10. Therefore each of the driver ICs 36 functions as a driving unit that drives each of the LEDs 35 as each of the light-emitting units. It should be noted that the driver IC 36 may be composed of a single driver IC as long as it can drive each of the LEDs 35 in each of the LED array chips 34 corresponding to the image to be formed, and may be provided on a substrate different from the substrate 31, and is not limited to the configuration of the first embodiment.

Each of the driver ICs 26 has a memory 37 (refer to FIG. 1). Data such as light quantity correction data (light quantity correction data CD to be described) for correcting the light-emitting light quantity at the time of driving each of the LEDs 35 as a light source is stored in the memory 37. Each of the driver-ICs 36 can refer to the data stored in the memory 37 and drive each of the LEDs 35 by using the data. Therefore the memory 37 functions as a memory unit that stores the data to which the driver IC 36 refers for driving each of the light-emitting units (LEDs 35). A method of setting the light quantity correction data (light quantity correction data CD) will be in detail explained later. It should be noted that the memory 37 is not necessarily provided in the driver IC 36, and, for example, may be provided on the substrate 31 independently from the driver IC 36, or a memory in a side of the main body on which the print head 30 is mounted may be used instead of the memory 37, and the memory for storing the data is not limited to the configuration of the first embodiment.

In detail, the light quantity correction data (light quantity correction data CD) to be described later may be stored (recorded) in the memory unit (memory 37 in the first embodiment) provided in the print head 30, that is, may be recorded and retained in the print head 30. In addition, the light quantity correction data (light quantity correction data CD) may be stored (recorded) in a memory in the side of a main body where the print head 30 is provided, that is, may be retained in the print head 30 without being directly recorded in the print head 30. Examples of a method of storing (recording) the light quantity correction data (light quantity correction data CD) in the memory in the side of the main body may include methods as follows. As one example, the light quantity correction data (light quantity correction data CD) is first printed as a barcode on the print head. According to this example, at the time of incorporating the print head into an image forming apparatus body (image forming apparatus 10), the light quantity correction data is read out from the printed barcode, and the light quantity correction data is associated with the print head, which is recorded in the memory in the side of the main body. In addition, as another example, the light quantity correction data and the identification number corresponding thereto are stored in a memory device or the like separately from the memory in the main body, and the identification number is printed as a barcode on the print head. According to this other example, at the time of incorporating the print head into the image forming apparatus body (image forming apparatus 10), the identification number is read out from the printed barcode, and the identification number is used to read out the light quantity correction data corresponding to the identification number from the memory device or the like. Further, in the other example, the read light quantity correction data is associated with the print head on which the barcode of the identification number corresponding thereto is printed to be recorded in the memory in the side of the main body.

Figure 4:
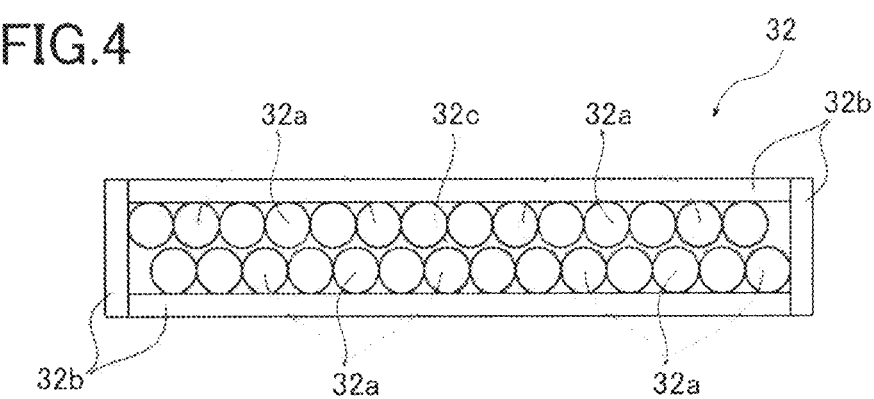
FIG. 4 is a cross section showing the configuration of a lens array, taken along lines I-I in FIG. 2.

The lens array 32 forms an image on a charging face of the photoconductor 11 with the light emitted from each of the LEDs 35 in each of the LED array chips 34, and, for example, may be configured of a micro lens array, a refractive index distribution type rod lens array or the like. In the first embodiment, the lens array 32 uses a refractive index distribution type rod lens array. The lens array 32, as shown in FIG. 4, includes a plurality of refractive index type rod lens 32a, which are arranged in two lines in such a manner as to alternately overlap in a two-tiered manner.

The respective refractive index distribution type rod lenses 32a are supported by peripheral wall members 32b surrounding the periphery. The peripheral wall member 32b is formed of a plastic material in which glass having a linear expansion coefficient equivalent to that of each of the refractive index distribution type rod lenses 32a is dispersed. In the peripheral wall member 32b, resins 32c are filled in a gap between the respective refractive index distribution type rod lenses 32a. The resins 32c are provided to suppress flare light from leaking from the gap between the neighbor refractive index distribution type rod lenses 32a, and are formed by filling and hardening opaque resins (black resins in the first embodiment) in the gap.

Therefore in the print head 30, the light that is emitted from each of the LEDs 35 in each of the LED array chips 34 is collected by the lens array 32 to form an image on the surface of the photoconductor 11. As a result, the print head 30 can form the light spots SP in the same number as the respective LEDs 35 by the respective LEDs 35. It should be noted that the light spot SP is also described as a light spot SPk at the time of showing any one of the plurality of light spots SP. "k" is the aforementioned identifier showing which light spot of all the light spots SP is targeted, and is a natural number except for a zero. Therefore by emitting (exposing) light on the charging face of the photoconductor 11, an electrostatic latent image corresponding to an image of the corresponding color can be formed.

In the print head 30, as described above, the number of the respective LED array chips 34 (the respective LEDs 35) is set such that the LED 35 as one light source should be associated individually (for example, one-to-one) with one dot of the image (electrostatic latent image) to be formed. However, variations in characteristic of each of the light sources occur in each of the LEDs 35 (each of the LED array chips 35), for example, by manufacturing errors. Then, in the print head 30, the variations in characteristic of each of the LEDs 35 gives an adverse influence on each dot in the formed image to generate a longitudinal streak (density unevenness) in the image. Therefore, in the print head 30, light quantity correction data (light quantity correction value) to each of the LEDs 35 is set to appropriately adjust the light quantity of each of the LEDs 35, which is stored in the memory 37 (refer to FIG. 1), and the driver IC 36 drives each of the LEDs 35 with the light quantity correction data.

In the print head 30 according to the first embodiment of the present invention, the light quantity correction data (light quantity correction value) set by the method of manufacturing the print head according to the first embodiment of the present invention (method of setting the light quantity correction data (light quantity correction value) is stored in the memory 37 (refer to FIG. 1). In the method of manufacturing the print head according to the present invention (method of setting the light quantity correction data (light quantity correction value)), a light power density (light quantity per area) in the light from each of the LEDs 35 is used to set the light quantity correction data. This is because attention is focused on the event that in the method of manufacturing the print head (method of setting the light quantity correction data), the developing toner amount to form an image on the recording medium P is determined depending on the light power density (light quantity per area) in the light from each of the LEDs 35. In detail, in the image to be formed on the recording medium P, an area where the developing toner amount is locally large appears as a black streak, and an area where the developing toner amount is locally small appears as a white streak. The developing toner amount is determined depending on the light power density in the light from each of the LEDs 35. The light power density in the light from each of the LEDs 35 can be expressed by a ratio of the light quantity (or a value closely related to the light quantity) and the magnitude in the light spot SP formed by each of the LEDs 35. Therefore in the method of manufacturing the print head, the ratio of the light quantity (or the value closely related to the light quantity) and the magnitude in the light spot SP formed by each of the LEDs 35 is used to set the light quantity correction data to eliminate the variations in the light power density. In other words, in the method of manufacturing the print head, the light quantity correction data is set to eliminate the variations in the light power density by using the light power density in the light from each of the LEDs 35 as a factor. In the method of manufacturing the print head, the set light quantity correction data is stored in the memory 37 to manufacture the print head 30 retaining the light quantity correction data. Thereby in the print head 30 manufactured by the method of manufacturing the print head, the driver IC 36 drives each of the LEDs 35 by using the light quantity correction data stored in the memory 37. Therefore in the print head 30, the light quantity in the light emitted from each of the LEDs 35 is corrected to make the developing toner amount substantially uniform. Accordingly, it is possible to appropriately prevent generation of the longitudinal streak (density unevenness) on the image.

Next, an explanation will be specifically made of the method of setting the light quantity correction data (light quantity correction value) in the method of manufacturing the print head according to the present invention. In the method of manufacturing the print head according to the first embodiment of the present invention, as described above, the ratio of the light quantity (or the value closely related to the light quantity) and the magnitude in the light spot SP formed by each of the LEDs 35 is used for setting the light quantity correction data. In other words, the light power density (light quantity per area) in the light from each of the LEDs 35 is used as a factor for setting the light quantity correction data. In the method of manufacturing the print head according to the first embodiment of the present invention, the ratio (factor) will be found as follows.

First, in the print head 30, the driver IC 36 drives each of the LEDs 35 without using any light quantity correction data to cause each of the LEDs 35 to emit light and correct the light with the lens array 32, thus forming a light spot SP on an image. An intensity distribution of the light spot SP formed on the image is measured to obtain a two-dimensional beam profile (refer to FIG. 5) of the light spot SP. In an example shown in FIG. 5, the measurement of the intensity distribution of the light spot SP is made with the scanning of a one-dimensional line CCD in the main-scanning direction. In the measurement result (two-dimensional beam profile) (refer to FIG. 5) obtained thereby, the pixel number is set to 210 pixels in the main-scanning direction, and 39 pixels in the sub-scanning direction, and the pixel pitch is set to 4 μm in the main-scanning direction, and 4.7 μm in the sub-scanning direction. Here, in the example shown in FIG. 5, 40 pieces of the LEDs 35 line up in line in the LED array chip 34 of the print head 30. In the example shown in FIG. 5, one LED 35 is lit on every eight pieces of the LEDs 35 and such measurement of the intensity distribution is repeated eight times, thus performing the measurement of the light spots SP corresponding to all the LEDs 35 (dots) of the LED array chip 34. This measurement is performed to all the LED array chips 34 in the print head 30, thus making it possible to obtain the two-dimensional beam profiles (refer to FIG. 5) of "k" ("k" shows the number from one to 40) pieces of the light spots SP formed by the respective LEDs 35 in the print head 30.

It should be noted that in the first embodiment, the one-dimensional line CCD scans in the main-scanning direction, but if the two-dimensional beam profile of each of the light spots SP can be obtained, for example, a two-dimensional CCD may be used for measurement or the other method may be used, and the measurement method is not limited to the method in the first embodiment. Further, in the first embodiment, the two-dimensional beam profile of each of the light spots SP is obtained, but a one-dimensional beam profile of each of the light spots SP may be obtained, and the beam profile of the light spot SP is not limited to the method in the first embodiment. An example of the method of obtaining the one-dimensional beam profile may include a method of causing a light detecting unit configured of a slit provided in a photodiode to scan in a direction where the respective LEDs 35 are lined up in line and obtain the one-dimensional beam profile.

Figure 5:
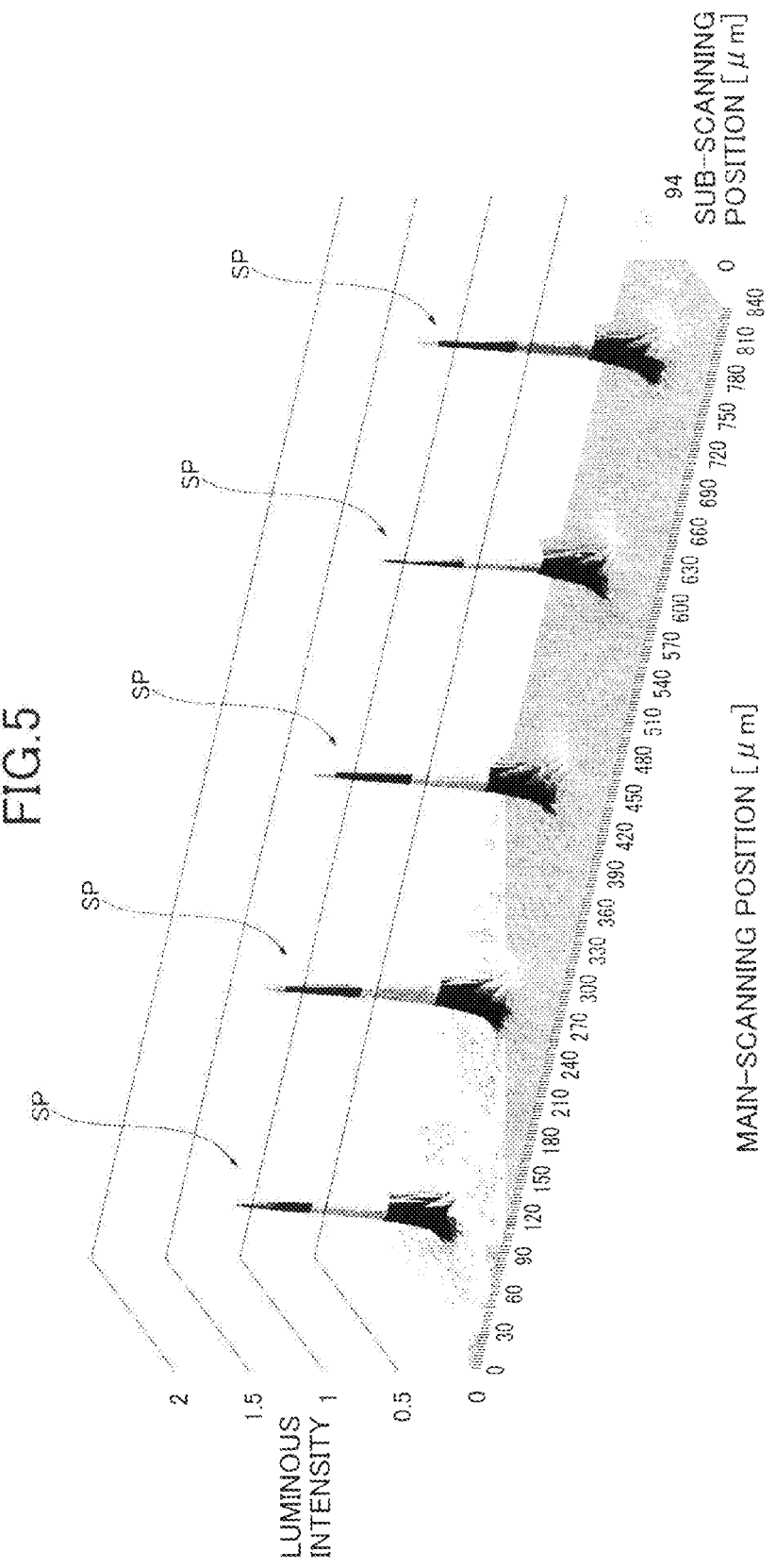
FIG. 5 is a graph showing a two-dimensional beam profile of each of light spots, wherein one lateral axis indicates a position [µm] in a main-scanning direction, the other lateral axis indicates a position [µm] in a sub-scanning direction, and a vertical axis indicates a luminous intensity.
Figure 6:
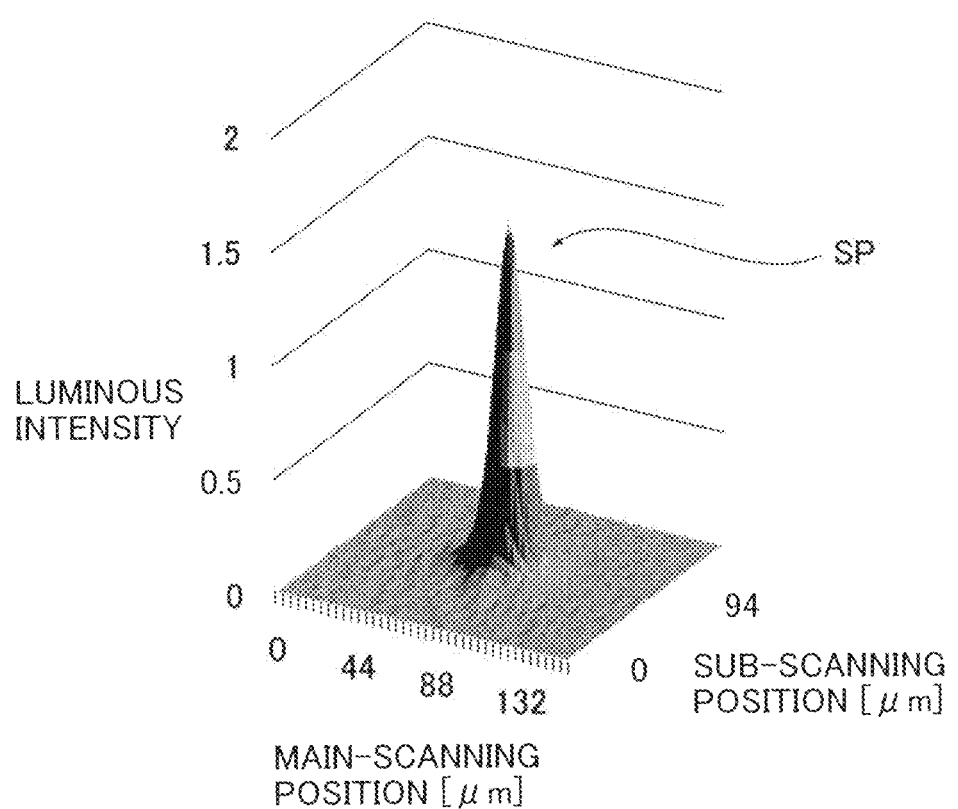
FIG. 6 is a graph showing a two-dimensional beam profile of one light spot in FIG. 5, and similar to FIG. 5.

Next, a one-dimensional beam profile in the main-scanning direction and a one-dimensional beam profile in the sub-scanning direction are generated from the obtained two-dimensional beam profile of each of the light spots SP (refer to FIG. 5). This will be explained by taking the two-dimensional beam profile (refer to FIG. 6) of the light spot SP positioned in the most left side in FIG. 5 as an example. In the example shown in FIG. 6, the pixel number in the main-scanning direction amounts to 42 pixels that is one-fifths of that in the example shown in FIG. 5, and the pixel number in the sub-scanning direction amounts to 39 pixels as similar to the example shown in FIG. 6. In the method of manufacturing the print head in the first embodiment, in the two-dimensional beam profile of the light spot SP shown in FIG. 6, the respective intensities of the pixels in positions equal as viewed in the main-scanning direction are added in the sub-scanning direction to generate a one-dimensional beam profile in the main-scanning direction shown in FIG. 7. Likewise in the two-dimensional beam profile of the light spot SP shown in FIG. 6, the respective intensities of the pixels in positions equal as viewed in the sub-scanning direction are added in the main-scanning direction to generate a one-dimensional beam profile in the sub-scanning direction shown in FIG. 8.

Next, first light quantity related data PW in the light spot SP and first magnitude related data BS in the light spot SP are found based upon the one-dimensional beam profiles in the two scanning directions. The first light quantity related data PW includes data showing the light quantity in the light spot SP or data closely related to the light quantity in the light spot SP. That is, the first light quantity related data PW is a value that increase/decreases in accordance with an increase/decrease in light quantity forming the light spot SP, and a value substantially in proportion to the light quantity. In addition, The first magnitude related data BS is data showing the magnitude of the light spot, that is, data showing a region where the light (light intensities) forming the light spot is distributed. That is, the first magnitude related data BS is a value that increases/decreases in accordance with an increase/decrease of the magnitude (diameter dimension or area) of the light spot SP to be formed.

First, an explanation will be made of a method of finding the first light quantity related data PW in the method of manufacturing the print head according to the first embodiment. First, a first threshold Th1 (refer to FIG. 7 and FIG. 8) is set for finding the first light quantity related data PW. The first threshold Th1 defines a lower limit value in intensity used for finding the first light quantity related data PW in the one-dimensional beam profiles in the two scanning directions. That is, in the method of manufacturing the print head, an intensity value larger than the first threshold Th1 is set as effective data in the light spot SP of finding the first light quantity related data PW. The first threshold Th1 may be set as needed corresponding to each of the light spots SP to be formed, but is preferably set to be low from a point of view of appropriately suppressing the generation of the longitudinal streak. Therefore in the method of manufacturing the print head according to the first embodiment, the first threshold Th1 is set to 15% or less of a peak intensity in the light spot SP, more preferably 10% or less of the peak intensity in the light spot SP. In each example of FIG. 7 and FIG. 8, the first threshold Th1 is set to 4% of each peak intensity in all the light spots SP. It should be noted that the first threshold Th1 may be set to a zero (0% of the peak intensity in the light spot SP). In this case, the first light quantity related data PW is found using all the values in the intensity distribution measured as the light spots SP, that is, substantially in the same way as in the case of not providing the first threshold Th1.

Figure 7:
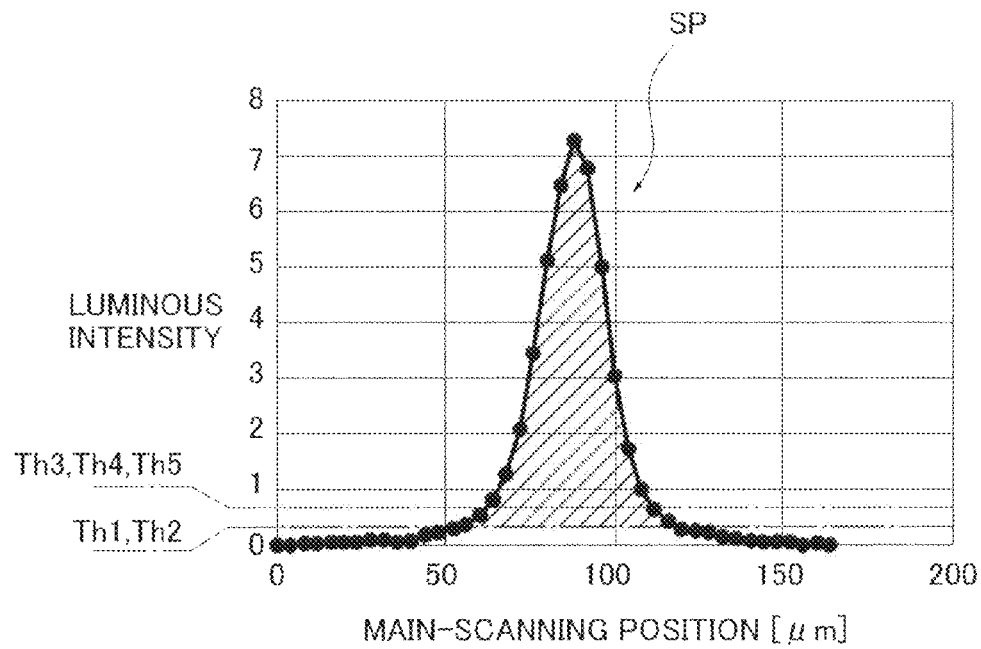
FIG. 7 is a graph showing a one-dimensional beam profile in the main-scanning direction, wherein a lateral axis indicates a position [µm] in the main-scanning direction, and a vertical axis indicates a luminous intensity.

According to the method of manufacturing the print head, in the one-dimensional beam profile in the main-scanning direction shown in FIG. 7, intensity values that are values each larger than the first threshold Th1 are added to find the light quantity in the main-scanning direction. That is, the light quantity PWm in the main-scanning direction is found by integrating values each larger than the first threshold Th1 in the graph showing the one-dimensional beam profile in the main-scanning directions. At this time, the first threshold Th1 may be included or not in the light quantity PWm. From this point, in the graph shown in FIG. 7, a region (the area (hatched location)) surrounded by a curved line showing the one-dimensional beam profile and by a straight line showing the first threshold Th1 indicates the light quantity PWm in the main-scanning direction. Similarly according to the method of manufacturing the print head, in the one-dimensional beam profile in the sub-scanning direction shown in FIG. 8, the light quantity PWs in the sub-scanning direction is found by adding all intensity values each larger than the first threshold Th1. In addition, in the method of manufacturing the print head, an average value between the light quantity PWm in the main-scanning direction and the light quantity PWs in the sub-scanning direction is found to find the first light quantity related data PW. At the time of finding the first light quantity related data PW, the averaging processing may be executed by using the first light quantity related data PW in the sequential light spots SP respectively. It is possible to suppress the generation of the longitudinal streak due to measurement errors by executing the averaging processing. An example of the averaging processing may include execution of noise removal by performing moving-average with the respective first light quantity related data PW in the sequential light spots SP. Here, in the exact meaning, the first light quantity related data PW found in this manner is not the data showing the light quantity itself of the light spot SP as a target, but the data closely related to the light quantity of the light spot SP.

It should be noted that the first light quantity related data PW is preferably found as described above, but in regard to finding the data extremely closely related to the light quantity of the light spot SP, the method of finding the first light quantity related data PW is not limited to that of the first embodiment, but other methods may be adopted therefor. An example of the other method may include a method of finding the first light quantity related data PW with addition of the light quantity PWm in the main-scanning direction and the light quantity PWs in the sub-scanning direction. In addition, another example of the other method may include a method of finding the first light quantity related data PW by adding all intensity values each larger than the first threshold Th1 in the two-dimensional beam profile (refer to FIG. 6) of the light spot SP.

Next, an explanation will be made of a method of finding first magnitude related data BS in the method of manufacturing the print head according to the first embodiment. First, a second threshold Th2 (refer to FIG. 7 and FIG. 8) is set for finding the first magnitude related data BS. The second threshold Th2 defines a lower limit value in intensity used to find the first magnitude related data BS in the one-dimensional beam profiles in the two scanning directions. That is, in the method of manufacturing the print head, an intensity value that is a value larger than the second threshold Th2 is set as effective data in the light spot SP of finding the first magnitude related data BS. The second threshold Th2 may be appropriately set corresponding to each of the light spots SP to be formed, and may be equal to or different from the first threshold Th1, but is preferably set to be low from a point of view of appropriately suppressing the generation of the longitudinal streak. Therefore in the method of manufacturing the print head according to the first embodiment, the second threshold Th2 is set to 15% or less of a peak intensity in the light spot SP, more preferably 10% or less of the peak intensity in the light spot SP. In each example of FIG. 7 and FIG. 8, the second threshold Th1 is set to 4% of each peak intensity in all the light spots SP to be a value equal to the first threshold Th1. It should be noted that the second threshold Th2 may be, as similar to the first threshold Th1, set to a zero (0% of a peak intensity in the light spot SP). In this case, the first magnitude related data BS is found using all the values in the intensity distribution measured as the light spots SP, that is, in the same way as in the case of substantially not providing the second threshold Th2.

According to the method of manufacturing the print head, in the one-dimensional beam profile in the main-scanning direction shown in FIG. 7, a width dimension in an intensity value as the second threshold Th2 is found to be defined as a width BSm in the main-scanning direction. That is, the width BSm in the main-scanning direction is a magnitude dimension as viewed in the main-scanning direction, which is an intensity value that is a value larger than the second threshold Th2. At this time, the second threshold Th2 may be included or not in the width BSm. From this point, in the graph shown in FIG. 7, a range (the length dimension) surrounded by a curved line showing the one-dimensional beam profile in a straight line showing the second threshold Th2 shows the width BSm in the main-scanning direction. Similarly according to the method of manufacturing the print head, in the one-dimensional beam profile in the sub-scanning direction shown in FIG. 8, a width dimension (diameter dimension) in an intensity value as the second threshold Th2 is found to be defined as a width BSs in the sub-scanning direction. In addition, in the method of manufacturing the print head, the first magnitude related data BS is found based upon the width BSm in the main-scanning direction and the width BSs in the sub-scanning direction, that is, based upon two different diameter dimensions in the light spots SP. In the method of manufacturing the print head according to the first embodiment, the first magnitude related data BS is found by multiplying the width BSm in the main-scanning direction by the width BSs in the sub-scanning direction. At the time of finding the first magnitude related data BS, the averaging processing may be executed by using the first magnitude related data BS in the sequential light spots SP respectively. It is possible to suppress the generation of the longitudinal streak due to measurement errors by executing the averaging processing. An example of the averaging processing may include execution of noise removal by performing moving-average with the respective first magnitude related data BS in the sequential light spots SP. Here, the first magnitude related data BS found in this manner is the data extremely closely related to the magnitude (diameter dimension or area) of the light spot SP.

It should be noted that the first magnitude related data BS is preferably found as described above, but in regard to the method of finding the data showing the magnitude of the light spot SP, the method of finding the first magnitude related data BS is not limited to that of the first embodiment, but other methods may be adopted therefor. An example of the other methods may include a method of finding the first magnitude related data BS based upon the width dimension, such as use of the width BSm in the main-scanning direction as the first magnitude related data BS or use of the width BSs in the sub-scanning direction as the first magnitude related data BS without any change. In addition, another example of the other methods may include a method of finding the first magnitude related data BS based upon an area, such as finding an area of a region as an intensity value that is a value larger than the second threshold Th2 in the two-dimensional beam profile (refer to FIG. 6) of the light spot SP to be the first magnitude related data BS. Further, the other example of the other methods may include a method of finding the first magnitude related data BS based upon a diameter dimension, such as finding a width dimension of a region as an intensity value that is a value larger than the second threshold Th2 in the two-dimensional beam profile (refer to FIG. 6) of the light spot SP to be the first magnitude related data BS. In addition, the further other example of the other methods may include a method of finding the first magnitude related data BS based upon two different diameter dimensions, such as finding a width dimension of a region as an intensity value that is a value larger than the second threshold Th2 in the two-dimensional beam profile (refer to FIG. 6) of the light spot SP in each of two directions, and multiplying the found two different width dimensions to be the first magnitude related data BS.

Next, in the method of manufacturing the print head according to the first embodiment, a ratio between the first light quantity related data PW and the first magnitude related data BS that are found as described above is found, which is made to first ratio data PD. In the first embodiment, the first ratio data PD is indicated at a ratio (PD=PW/BS) of the first light quantity related data PW to the first magnitude related data BS. Therefore the first ratio data PD is a value (amount) equivalent to a light power density (light quantity per area) in the light spot SP as a target, and in the method of manufacturing the print head, the first ratio data PD becomes a factor for setting the light quantity correction data. It should be noted that the first ratio data PD (factor) that is the ratio between the first light quantity related data PW and the first magnitude related data BS may be a ratio (PD=BS/PW) of the first magnitude related data BS to the first light quantity related data PW, and is not limited to that of the aforementioned first embodiment. In this case, the first ratio data PD (factor) shows an inverse number of the light power density (light quantity per area). In this manner, in the method of manufacturing the print head, the ratio (the first ratio data PD (factor)) between the light quantity (or value closely related to the light quantity) and the magnitude in the light spot SP formed by each of the LEDs 35 can be found.

In the method of manufacturing the print head, for setting the light quantity correction data by using the first ratio data PD (factor), a ratio (first ratio data PDk (factor)) in each of all the light spots SPk is found as similar to the above. In addition, in the method of manufacturing the print head, an average value of the first ratio data PSk (factor) in all the light spots SPk is found to find a first ratio average value $PD_{ave}$. In addition, in the method of manufacturing the print head according to the first embodiment, light quantity correction data CDk [%] is calculated by the following expression (1) as the light quantity correction data to each of the LEDs 35 forming the light spot SPk as a target. It should be noted that a sign "k" in the first ratio data PDk and in the light quantity correction data CDk is the aforementioned identifier ("k" is a natural number other than a zero) indicating which one of all the light spots SP is targeted, and is a numeral equal to the sign "k" in the light spot SPk.

$$CDk = \{(PDk/PD_{ave}) - 1\} \times PC \quad (1)$$

In this expression (1), PC is a proportional constant. The proportional constant PC is appropriately set in accordance with an image formation process such as developing since the developing tonner amount changes by a difference of the image formation process. In this way, in the light quantity correction data CDk, the ratio between the light quantity (or value closely related to the light quantity) and the magnitude in the light spot SPk as a target is used. In other words, in the light quantity correction data CDk, the light power density (light quantity per area) in the light spot SPk as a target is used as a factor. In addition, the light quantity correction data CDk is set to eliminate the variations in light power density by using the ratio between the light quantity (or value closely related to the light quantity) and the magnitude in the light spot SPk as a target. It should be noted that in the method of manufacturing the print head according to the first embodiment, the light quantity correction data CDk is found according to the expression (1), but when the light quantity correction data CDk is only found by using the ratio between the light quantity (or value closely related to the light quantity) and the magnitude in the light spot SPk as a target, the method of finding the light quantity correction data CDk is not limited to the method of the first embodiment (expression (1)).

Figure 9:
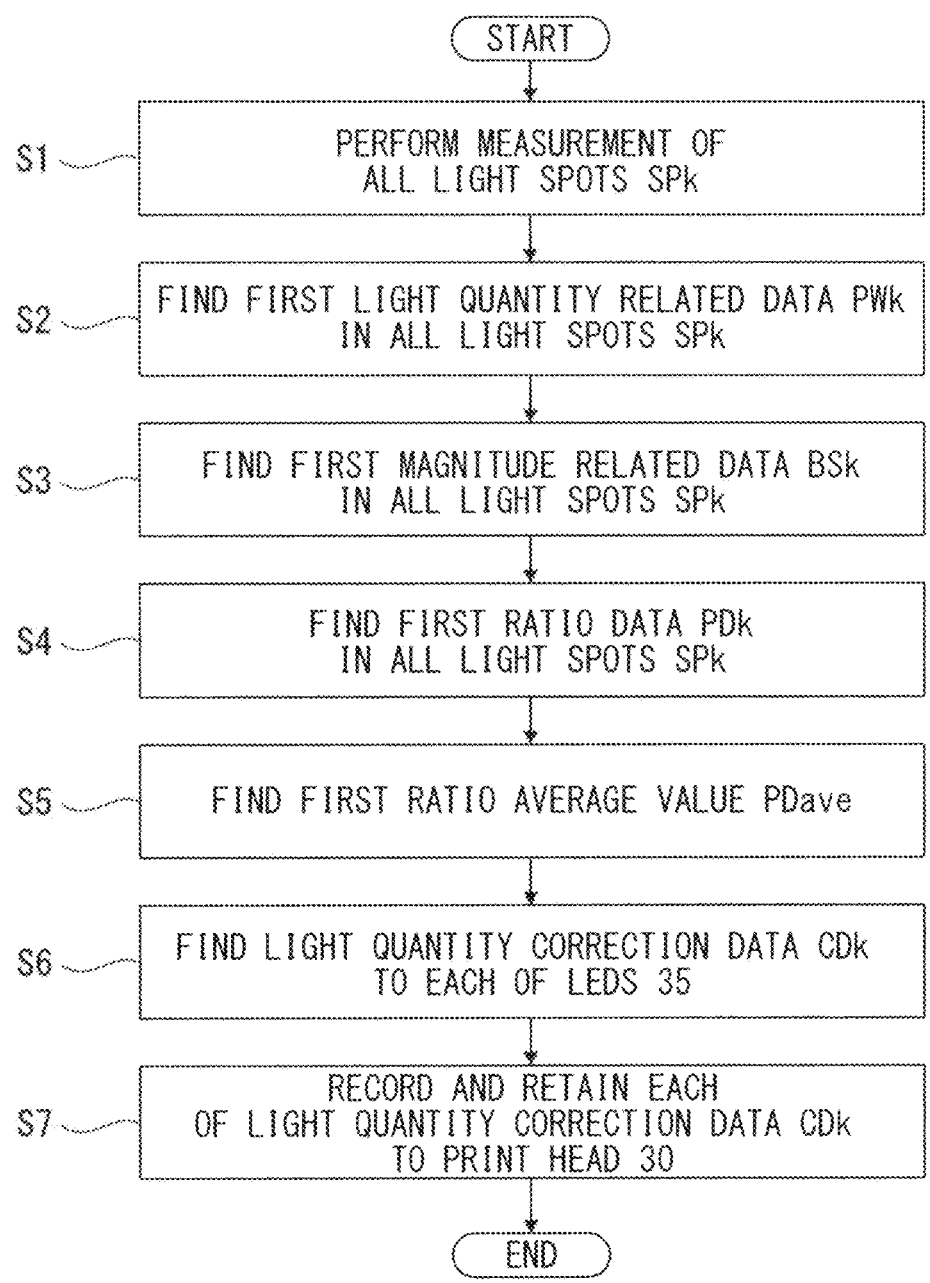
FIG. 9 is a flow chart showing processing of setting light quantity correction data (light quantity correction value) in the method of manufacturing the print head according to the first embodiment.

Next, an explanation will be made of the processing for setting the light quantity correction data (light quantity correction value) in the method of manufacturing the print head according to the first embodiment of the present invention with reference to FIG. 9. FIG. 9 is flow chart showing the processing for setting the light quantity correction data (light quantity correction value) in the method of manufacturing the print head according to the first embodiment. Hereinafter, an explanation will be made of each step (each process) of the flow chart in FIG. 9. A target to be executed in the flow chart in FIG. 9 will be the print head 30 assembled as described above.

In step S1, the measurement of all the light spots SPk formed in the print head 30 is performed, and the process goes to step S2. In step S1, as described above, each of the light spots SPk formed on a field by causing the driver IC 36 to drive each of the LEDs 35 is measured without using any light quantity correction data. In step S1 of the first embodiment, a single LED 35 is lit up to form each of the light spots SPk, and a two-dimensional beam profile (refer to FIG. 5) of each of the light spots SPk is obtained.

In step S2, subsequent to performing the measurement of all the light spots SPk formed in the print head 30 in step S1, first light quantity related data PWk in all the light spots SPk is found, and the process goes to step S3. In step S2, as described above, the first light quantity related data PWk in all the light spots SPk is found by using a first threshold Th1 to the measurement result of the light spots SPk as a target in step S1. In step S2, the first light quantity related data PWk in all the light spots SPk is found by targeting all the light spots SPk. Therefore step S2 becomes a first process of finding the first light quantity related data PW showing the light quantity in the light spot SP formed by lighting up the light-emitting unit (LED 35) by the driver IC 36 as the driving unit by using the first threshold Th1.

In step S3, subsequent to finding the first light quantity related data PWk in all the light spots SPk in step S2, first magnitude related data BSk in all the light spots SPk is found, and the process goes to step S4. In step S3, as described above, the first magnitude related data BS in the light spots SPk is found by using a second threshold Th2 to the measurement result of the light spots SPk as a target in step S1. In step S3, the first magnitude related data BSk in all the light spots SPk is found by targeting all the light spots SPk. It should be noted that step S3 may be executed at the same time with step S2 or before step S2, and is not limited to the configuration of the first embodiment. This is because any of step S2 and step S3 uses the measurement result in step S1, and the processing content of one of step S2 and step S3 has no influence on that of the other. Therefore step S2 becomes a second process of finding the first magnitude related data BS showing the magnitude in the light spot SP formed by lighting up the light-emitting unit (LED 35) by the driver IC 36 by using the second threshold Th2.

In step S4, subsequent to finding the first magnitude related data BSk in all the light spots SPk in step S3, first ratio data PDk in all the light spots SPk is found, and the process goes to step S5. In step S4, as described above, for setting the light quantity correction data, the first ratio data PDk as a ratio between the first light quantity related data PW found in step S2 and the first magnitude related data BS found in step S3 is found in all the light spots SPk. That is, in step S4, a value (amount) equivalent to the light power density (light quantity per area) in all the light spots SPk is found. In step S4 of the first embodiment, as described above, the first ratio data PDk is found to all the light spots SPk as the ratio of the first light quantity related data PWk to the first magnitude related data BSk (PDk=PWk/BSk). Therefore step S4 becomes a third process of finding the first ratio data PD showing the ratio between the first light quantity related data PW and the first magnitude related data BS.

In step S5, subsequent to finding the first ratio data PDk in all the light spots SPk in step S4, a first ratio average value $PD_{ave}$ is found, and the process goes to step S6. In step S5, as described above, an average value of the first ratio data PDk in all the light spots SPk found in step S4 is found, which is made to the first ratio average value $PD_{ave}$.

In step S6, subsequent to finding the first ratio average value $PD_{ave}$ in step S5, light quantity correction data CDk to each of the LEDs 35 is found, and the process goes to step S7. In step S6, the light quantity correction data CDk to each of the LEDs 35 forming the light spot SPk as a target is found by using the ratio (factor) between the light quantity (or value closely related to the light quantity) and the magnitude in each of the light spots SPk found in step S4. In step S6 of the first embodiment, the light quantity correction data CDk [%] to each of the LEDs 35 is found by substituting the first ratio data PDk as the ratio (factor) found in step S4 and the first ratio average value $PD_{ave}$ found in step S5 to the aforementioned expression (1). Therefore step S6 becomes a fourth process of finding the light quantity correction data CD to the light-emitting unit (LED 35) forming the light spot SP as a target by using the first ratio data PD.

In step S7, subsequent to finding the light quantity correction data CDk to each of the LEDs 35 in step S6, each of the light quantity correction data CDk is recorded and retained in the print head 30 to complete the processing of setting the light quantity correction data (light quantity correction value). In step S7, each of the light quantity correction data CDk found in step S6 is recorded and retained in the print head 30 to be capable of being referred to for driving each of the LEDs 35. In step S7 of the first embodiment, the light quantity correction data CDk corresponding to the light spot SPk as a target is stored in the memory 37 (refer to FIG. 1) in each of the drivers IC 36 that drives each of the LEDs 35 forming the light spot SPk. Therefore step S7 becomes a fifth process of retaining the found light quantity correction data CD to the print head 30.

In the method of manufacturing the print head according to the first embodiment of the present invention, after the print head 30 is assembled as described above, the processing of setting the light quantity correction data (light quantity correction value) is executed (the flow chart in FIG. 9). In the flow chart in FIG. 9, the process goes to step S1, wherein each of the light spots SPk is formed on the field in the assembled print head 30, and each of the light spots SPk is measured. After that, in the flow chart in FIG. 9, the process goes in the order of step S2, step S3, and step S4, and thereby the first ratio data PDk as a ratio between the light quantity (or value closely related to the light quantity) and the magnitude in the light spot SPk is found by using the first light quantity related data PWk and the first magnitude related data BSk. In addition, in the flow chart in FIG. 9, the process goes to step S5 and then, step S6, and thereby the light quantity correction data CDk to each of the LEDs 35 forming the light spot SPk is found by using the first ratio data PDk (factor) in the light spot SP as a target. After that, in the flow chart in FIG. 9, the process goes to step S7, wherein the light quantity correction data CDk found corresponding to the light spot SPk formed by the LED 35 is stored in the memory 37 of the driver IC 36 driving each of the LEDs 35.

As a result, the method of manufacturing the print head according to the first embodiment of the present invention can manufacture the print head 30 in which the light quantity correction data CDk set as described above is stored in the memory 37 of each of the drivers IC 36 corresponding to each of the LEDs 35. Therefore in the print head 30 formed by the method of manufacturing the print head according to the first embodiment, each of the drivers IC 36 drives each of the LEDs 35 by using the light quantity correction data CDk set as described above and stored in the memory 37 (refer to FIG. 1). Therefore, in the print head 30 formed by the method of manufacturing the print head according to the first embodiment, it is possible to appropriately prevent the generation of the longitudinal streak in the formed image. This is accomplished as follows.

In the method of manufacturing the print head according to the first embodiment, the light quantity correction data CDk is set to eliminate the variations in the light power density by using the ratio between the light quantity (or a value closely related to the light quantity) and the magnitude in the light spot Sp formed by the each of the LEDs 35. In the method of manufacturing the print head according to the first embodiment, the set light quantity correction data CDk is stored in the memory 37 to manufacture the print head 30. Therefore in the print head 30, each of the LEDs 35 is driven by using the light quantity correction data CDk stored in the memory 37, and thereby the developing toner amount to be determined depending upon the light power density in the light from each of the LEDs 35 can be made substantially uniform. Therefore, the print head 30 can appropriately prevent the generation of the longitudinal streak (density unevenness) on the image.

Here, according to the conventional print head, the light quantity correction data generated such that a light quantity, a luminous diameter or a luminous area in each of light sources is constant or closer to be constant is used to drive each of the light sources. Even if the light quantity in each of the light sources is corrected to be constant, a diameter dimension of the light spot formed by each of the light sources does not become constant, and the light quantity is distributed corresponding to a diameter dimension or a shape of the light spot. Therefore in the conventional print head, variations in toner amount between dots to be formed are generated corresponding to a difference in diameter dimension between the light spots formed by the respective light sources or a difference in shape between the light spots. In addition, even if the luminous diameter or luminous area is corrected to be constant, the light quantity of each of the light sources does not become constant, and variations in toner amount between dots to be formed are generated corresponding to a difference in light quantity between the light spots formed by the respective light sources.

In addition, as in the case of the aforementioned Japanese Patent Laid-Open No. 2001-270146, even if the optical output of each of the light sources is corrected by the found third correction coefficient row, it is difficult to appropriately prevent variations in image density of the formed image. This is because of the following reason. In Japanese Patent Laid-Open No. 2001-270146, based upon the first correction coefficient row in a case of correcting the optical output in such a manner that the diameter of the optical spot is uniform, and the second correction coefficient row in a case of correcting the optical output of the luminous point to be uniform, the third correction coefficient row is found in such a manner that the image density is made uniform. Therefore according to the method in Japanese Patent Laid-Open No. 2001-270146, variations in toner amount between dots to be formed are generated at a point of correcting the optical output in such a manner that the diameter of the optical spot is uniform in the first correction coefficient row or in a point of correcting the optical output of the luminous point to be uniform in the second correction coefficient row. According to the method in Japanese Patent Laid-Open No. 2001-270146, the third correction coefficient row is found based upon the first correction coefficient row and second correction coefficient row in which variations in toner amount between dots to be formed are generated. For this reason, in the method according to Japanese Patent Laid-Open No. 2001-270146, the toner amount between dots to be formed cannot be constant even in the third correction coefficient row. This can be likewise applied to a case of replacing the spot diameter for the spot area. Therefore it is difficult to appropriately prevent the generation of the longitudinal streak (density unevenness) on the image in the conventional print head manufactured by the conventional method including Japanese Patent Laid-Open No. 2001-270146 as described above.

On the other hand, in the method of manufacturing the print head according to the first embodiment of the present invention, attention is focused on the event that the developing toner amount to form an image on the recording medium P is determined depending on the light power density (light quantity per area) in the light from each of the LEDs 35. In addition, in the method of manufacturing the print head, the ratio of the light quantity (or a value closely related to the light quantity) and the magnitude in the light spot SP formed by each of the LEDs 35 is used to set the light quantity correction data CDk. The ratio of the light quantity and the magnitude in the light spot SP formed by each of the LEDs 35 shows the light power density in the light from each of the light LEDs 35. In addition, in the method of manufacturing the print head, the ratio of the light quantity and the magnitude in the light spot SP formed by each of the LEDs 35 is used to set the light quantity correction data CDk to eliminate the variations in the light power density. In this way, in the method of manufacturing the print head, the light quantity in each of the LEDs 35 is not corrected in such a manner as to be constant, the luminous diameter or luminous area in each of the LEDs 35 is not corrected in such a manner as to be constant as in the case of the conventional technology, nor both of them are corrected in such a manner as to be constant. For this reason, in the method of manufacturing the print head according to the first embodiment of the present invention, it is possible to manufacture the print head 30 in which the developing toner amount can be made substantially uniform by correcting the light quantity in the light emitted from each of the LEDs 35 with the set light quantity correction data CDk. Therefore, the print head 30 manufactured in the method of manufacturing the print head according to the present invention can prevent the variations in tonner amount between dots to be formed, and appropriately prevent the generation of the longitudinal streak (density unevenness) on the image.

Figure 10:
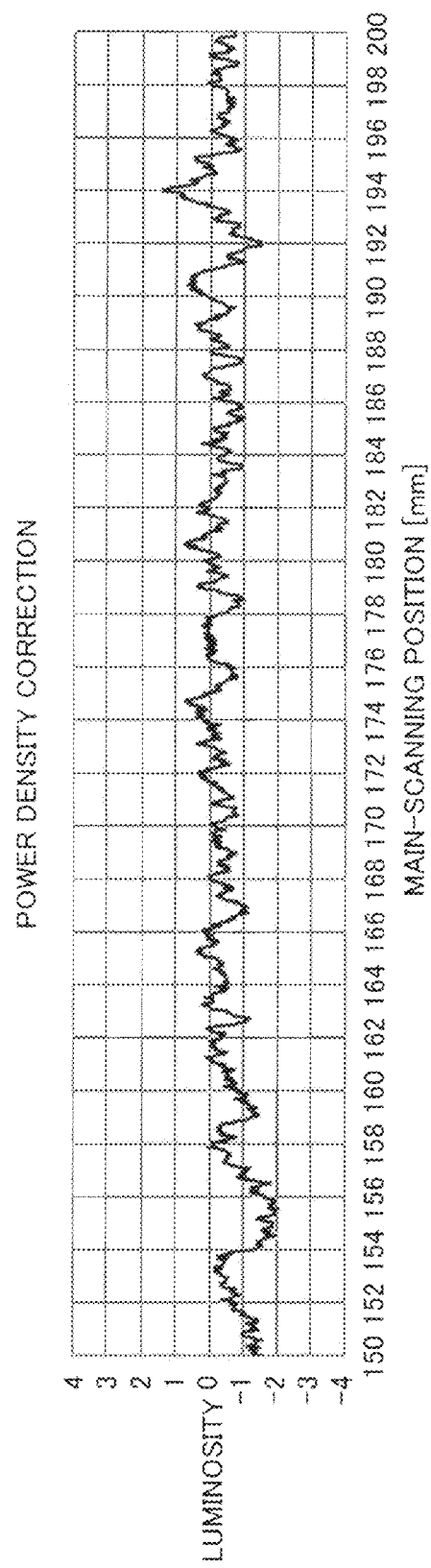
FIG. 10 is a graph showing a luminosity distribution in the main-scanning direction on an image formed by the print head according to the first embodiment, wherein a lateral axis indicates a position [mm] in the main-scanning direction, and a vertical axis indicates a difference in luminosity by setting a reference value as zero.
Figure 11:
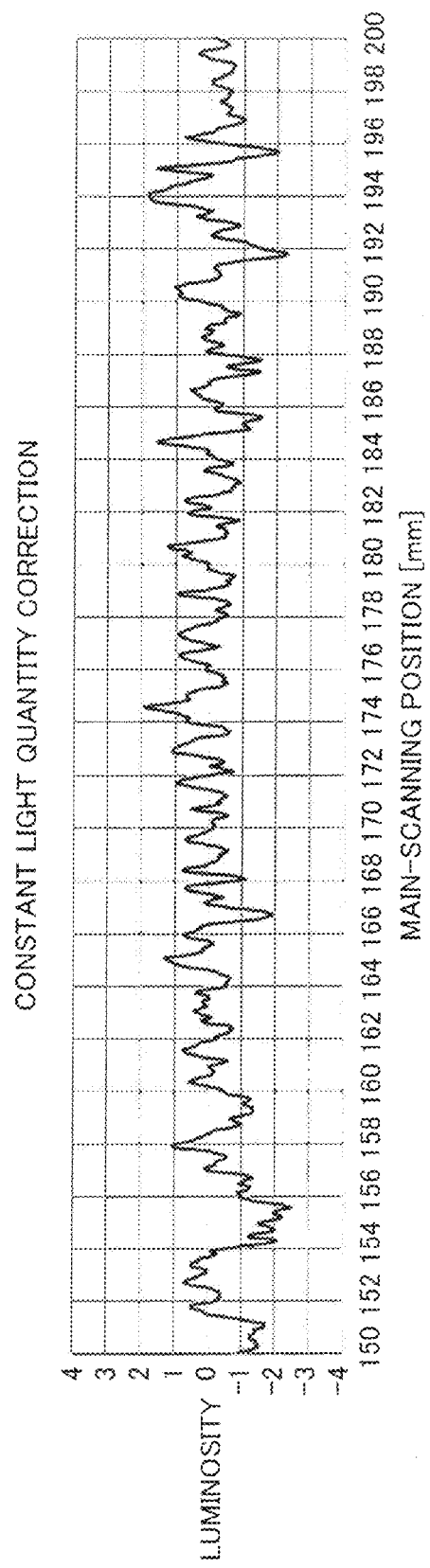
FIG. 11 is a graph showing a luminosity distribution in the main-scanning direction on an image formed by the print head making a constant correction to the light quantity, wherein a lateral axis indicates a position [mm] in the main-scanning direction, and a vertical axis indicates a difference in luminosity by setting a reference value as zero.
Figure 12:
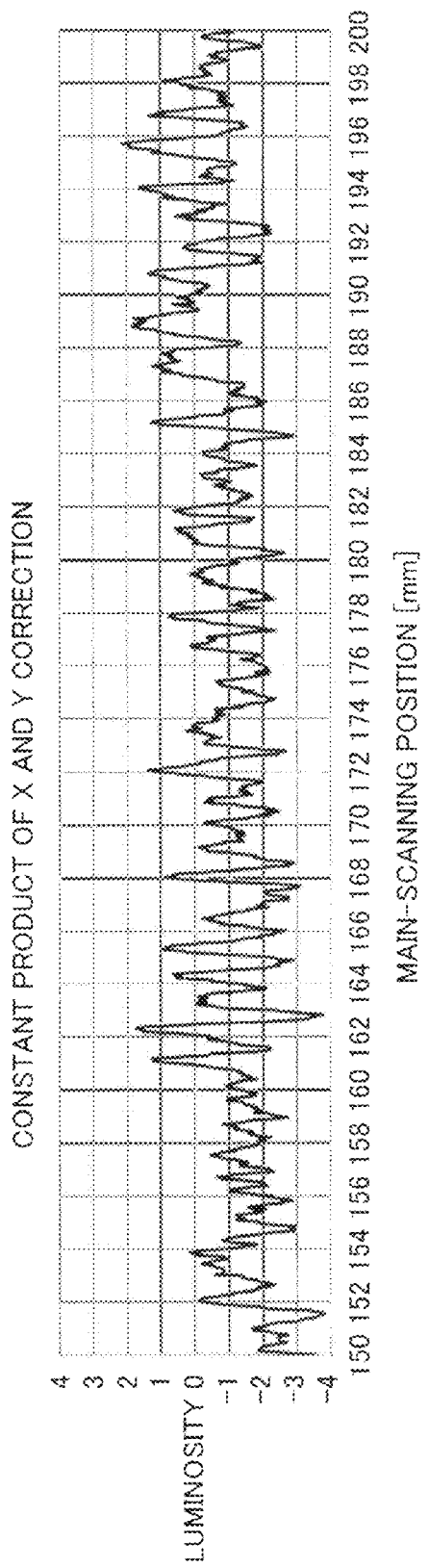
FIG. 12 is a graph showing a luminosity distribution in the main-scanning direction on an image formed by the print head making a constant correction to a product of X and Y, wherein a lateral axis indicates a position [mm] in the main-scanning direction, and a vertical axis indicates a difference in luminosity by setting a reference value as zero.

Next, an explanation will be made of the effect in the print head 30 that is manufactured using the method of manufacturing the print head according to the first embodiment of the present invention and makes the correction by using the light power density with reference to FIG. 10 to FIG. 12 showing the luminosity distribution as the measurement result for comparison with a print head in a comparative example. In FIG. 10 to FIG. 12, a vertical axis indicates a difference in luminosity by setting a reference value as a zero, and a lateral axis indicates a position [mm] in the main-scanning direction. In FIG. 10 to FIG. 12, the difference in luminosity indicated at the vertical axis is shown to be converted into a value equal to each other. FIG. 10 to FIG. 12 show the luminosity as the measurement result of only a part of the positions [mm] in the main-scanning direction.

FIG. 10 is a graph showing a luminosity distribution in a main-scanning direction on an image formed by the print head 30. FIG. 11 is a graph showing a luminosity distribution in a main-scanning direction on an image formed by the print head of correcting the light quantity with light quantity correction data generated in such a manner that the light quantity of each of the light sources is constant (constant light quantity correction). FIG. 12 is a graph showing a luminosity distribution in a main-scanning direction on an image formed by the print head of correcting the light quantity with light quantity correction data generated in such a manner that a product of X and Y is constant (constant product of X and Y correction). The product of X and Y means a product obtained by multiplying a diameter (X diameter) in the main-scanning direction by a diameter (Y diameter) in the sub-scanning direction. The print head that makes the constant product of X and Y correction can obtain the luminosity distribution in the main-scanning direction, which is extremely close to that of the print head using the light quantity correction data generated in such a manner that the luminous diameter or luminous area is constant.

It should be noted that the print head 30 used in FIG. 10 is manufactured by the processing of setting the light quantity correction data (light quantity correction value) in the method of manufacturing the print head according to the first embodiment shown in FIG. 9 as described above. In the print head 30, any of the first threshold Th1 and the second threshold Th2 of finding the first light quantity related data PW and the first magnitude related data BS is set to a value that is 4% of any of the peak values in all the light spots SP. In the print head 30, the proportional constant PC in the expression (1) of finding the light quantity correction data CDk [%] as the light quantity correction data to each of the LEDs 35 is set to 0.3. The print head 30 has a resolution of 1200 dpi, and an image formed by the print head 30 is read by a scanner of 600 dpi to measure the luminosity distribution on the image. This configuration is the same in the print head as a comparative example used in each of FIG. 11 and FIG. 12. In the luminosity distribution shown in FIG. 10, the noise removal is performed by executing the moving average of the data in five pieces of the light spots SPk continuous in the measurement result read by the scanner. In the luminosity distribution shown in each of FIG. 11 and FIG. 12, the noise removal is performed by executing the moving average of the data in 10 pieces of the light spots SPk continuous in the measurement result read by the scanner.

In the luminosity distribution shown in each of FIG. 10 to FIG. 12, the luminosity is plotted by removing the longitudinal streak (density unevenness) due to factors other than the print head (print head 30 and the print head in the comparative example). Therefore the graph showing the luminosity distribution shown in any of FIG. 10 to FIG. 12 means that the longitudinal streak is suppressed the more as the luminosity distribution is closer to a flat characteristic, and means a state where there is no longitudinal streak (density unevenness) at all when it comes to the flat characteristic. In the luminosity distribution shown in FIG. 10 as the measurement result of the print head 30 manufactured using the method of manufacturing the print head according to the first embodiment of the present invention, the variations in luminosity are smaller as compared to the luminosity distribution shown in FIG. 11 and the luminosity distribution shown in FIG. 12, and are closer to the flat characteristic. From this measurement result, it is found out that in the print head 30 that is manufactured using the method of manufacturing the print head according to the first embodiment of the present invention and makes the correction by using the light power density, the generation of the longitudinal streak can be appropriately prevented. On the other hand, it is found out that in the print head of making the constant light quantity correction or the constant product of X and Y correction, the longitudinal streak (density unevenness) is generated.

In this way, in the method of manufacturing the print head according to the first embodiment in the method of manufacturing the print head according to the present invention, the first ratio data PDk of the light quantity and the magnitude in the light spot SP formed by each of the light sources (each of the LEDs 35 in the first embodiment) is used to set the light quantity correction data CDk. That is, in the method of manufacturing the print head, the light power density in the light from each of the light sources (each of the LEDs 35) is used as a factor to set the light quantity correction data CDk. In addition, in the method of manufacturing the print head, the first ratio data PDk of the light quantity and the magnitude in the light spot SP formed by each of the light sources (each of the LEDs 35) is used to set the light quantity correction data CDk to eliminate the variations in light power density. Therefore, in the method of manufacturing the print head, it is possible to manufacture the print head 30 in which the developing toner amount can be made substantially uniform by correcting the light quantity in the light emitted from each of the light sources (each of the LEDs 35) with the set light quantity correction data CDk.

In addition, in the method of manufacturing the print head, the first ratio data PDk as the ratio between the light quantity and the magnitude in the light spot SP formed by each of the light sources (each of the LEDs 35) is found by using the first magnitude related data BS as the data showing the magnitude of the light spot SP. The first magnitude related data BS is found by multiplying one diameter dimension of the light spot SP (width BSm in the main-scanning direction in the first embodiment) by the other diameter dimension of the light spot SP (width BSs in the sub-scanning direction in the first embodiment). Therefore in the method of manufacturing the print head, the first magnitude related data BS can be found more easily as compared to a case of setting the area of the light spot SP to the first magnitude related data BS, and as compared to a case of setting the diameter dimension of the light spot SP in one direction to the first magnitude related data BS.

Further, in the method of manufacturing the print head, in the beam profile of the light spot SP as a target, the first magnitude related data BS is found by finding the width dimension (diameter dimension) in the intensity value as the second threshold Th2 set corresponding to each of the light spots SP to be formed. Therefore in the method of manufacturing the print head, it is possible to more appropriately find the first magnitude related data BS as the data showing the magnitude of the light spot SP. As a result, in the method of manufacturing the print head, the first ratio data PDk as the ratio between the light quantity and the magnitude in the light spot SP formed by each of the light sources (each of the LEDs 35) can be more appropriately found. Accordingly in the method of manufacturing the print head, the light quantity correction data (light quantity correction data CDk) using the first ratio data PDk can be more appropriately found.

In the method of manufacturing the print head, the first ratio data PDk as the ratio between the light quantity and the magnitude in the light spot SP formed by each of the light sources (each of the LEDs 35) is found using the first light quantity related data PW and the first magnitude related data BS. The first light quantity related data PW is the data showing the light quantity in the light spot SP, the data closely related to the light quantity in the light spot SP, and is found from the intensity value that is the value larger than the first threshold Th1 set corresponding to each of the light spots SP to be formed. Therefore in the method of manufacturing the print head, it is possible to find the first light quantity related data PW as the data more appropriately showing the light quantity in the light spot SP or data closely related to the light quantity in the light spot SP. As a result, in the method of manufacturing the print head, the first ratio data PDk as the ratio between the light quantity and the magnitude in the light spot SP formed by each of the light sources (each of the LEDs 35) is more appropriately found. Accordingly in the method of manufacturing the print head, the light quantity correction data (light quantity correction data CDk) using the first ratio data PDk can be more appropriately found.

In the method of manufacturing the print head, the light power density in the light from each of the light sources (each of the LEDs 35) is a factor for setting the light quantity correction data by using the first ratio data PD between the first light quantity related data PW and the first magnitude related data BS. Therefore in the method of manufacturing the print head, when the light quantity correction data is set using the first ratio data PD, it is possible to set the light quantity correction data in a simple method and more appropriately by using the light power density in the light from each of the light sources (each of the LEDs 35) as the factor. As a result, the method of manufacturing the print head can simply manufacture the print head 30 in which the developing toner amount is made substantially uniform to appropriately prevent the generation of the longitudinal streak (density unevenness) on the image formed by the print head 30.

In the method of manufacturing the print head, a value of the first threshold Th1 of finding the first light quantity related data PW is equal to a value of the second threshold Th2 of finding the first magnitude related data BS. Therefore in the method of manufacturing the print head, the first ratio data PDk as the ratio between the light quantity and the magnitude in the light spot SP formed by each of the light sources (each of the LEDs 35) can be closer to the light power density by the first light quantity related data PW and the first magnitude related data BS. Accordingly in the method of manufacturing the print head, the light quantity correction data (light quantity correction data CDk) using the first ratio data PDk can be more appropriately found.

In the method of manufacturing the print head, at the time of finding the first light quantity related data PW or the first magnitude related data BS, the averaging processing can be executed using each of the first light quantity related data PW or each of the first magnitude related data BS in the sequential light spots SP. In this case, the method of manufacturing the print head can prevent the generation of the variations in the developing toner amount by the manufactured print head 30 due to measurement errors in the first light quantity related data PW or the first magnitude related data BS. Therefore, the method of manufacturing the print head can manufacture the print head 30 in which the developing toner amount is made substantially uniform to more appropriately prevent the generation of the longitudinal streak (density unevenness) on the image formed by the print head 30.

In the print head 30 manufactured by the method of manufacturing the print head, it is possible to prevent the variations in toner amount between the dots to be formed to appropriately prevent the generation of the longitudinal streak (density unevenness) on the image.

In the image forming apparatus 10 provided with the print head 30 manufactured by the method of manufacturing the print head, it is possible to appropriately prevent the generation of the longitudinal streak (density unevenness) on the formed image, thus outputting an excellent image.

Accordingly, in the method of manufacturing the print head according to the first embodiment of the present invention, it is possible to manufacture the print head 30 that can appropriately prevent the generation of the longitudinal streak.

Second Embodiment

An explanation will be made of a method of manufacturing a print head according to a second embodiment of the present invention, a print head 30 of the second embodiment manufactured by the method of manufacturing the print head, and an image forming apparatus 10 of the second embodiment provided with the print head 30 with reference to FIG. 13. The method of manufacturing the print head according to the second embodiment is an example where a method of setting light quantity correction data (light quantity correction value) is different from the method of setting the light quantity correction data (light quantity correction value) according to the first embodiment. The method of manufacturing the print head according to the second embodiment has a basic concept and configuration (process) that are similar to those in the method of manufacturing the print head according to the first embodiment described above, and therefore components in the concept and configuration identical to those in the first embodiment are referred to as identical signs, and the detailed explanation thereof is omitted.

In the method of setting the light quantity correction data (light quantity correction value) in the method of manufacturing the print head according to the second embodiment, second magnitude related data BS2 as a second factor is found in addition to the first magnitude related data BS of finding the first ratio data PD (factor (hereinafter, referred to as a first factor)). The second magnitude related data BS2 (second factor) is data showing the magnitude of the light spot SPk for the first ratio data PD (first factor) to be targeted. In the method of manufacturing the print head according to the second embodiment, a fourth threshold Th4 (refer to FIG. 7 and FIG. 8) of finding the second magnitude related data BS2 is set. The fourth threshold Th4 defines a lower limit value in intensity used for finding the second magnitude related data BS2 in one-dimensional beam profiles in two scanning directions as similar to the second threshold Th2, and is set to a value different from the second threshold Th2. This is because the second magnitude related data BS2 is used as the second factor different from the first magnitude related data BS used for finding the first ratio data PD (first factor). The fourth threshold Th4 may be set as needed corresponding to each of light spots SP to be formed. It should be noted that the fourth threshold Th4 may be set as a zero (0% of a peak intensity of the light spot SP) as similar to the second threshold Th2. In this case, the second magnitude related data BS2 is to be found using all the values of the intensity distribution measured as the light spot SP, that is, as similar to a case of substantially not providing the fourth threshold Th4.

Figure 8:
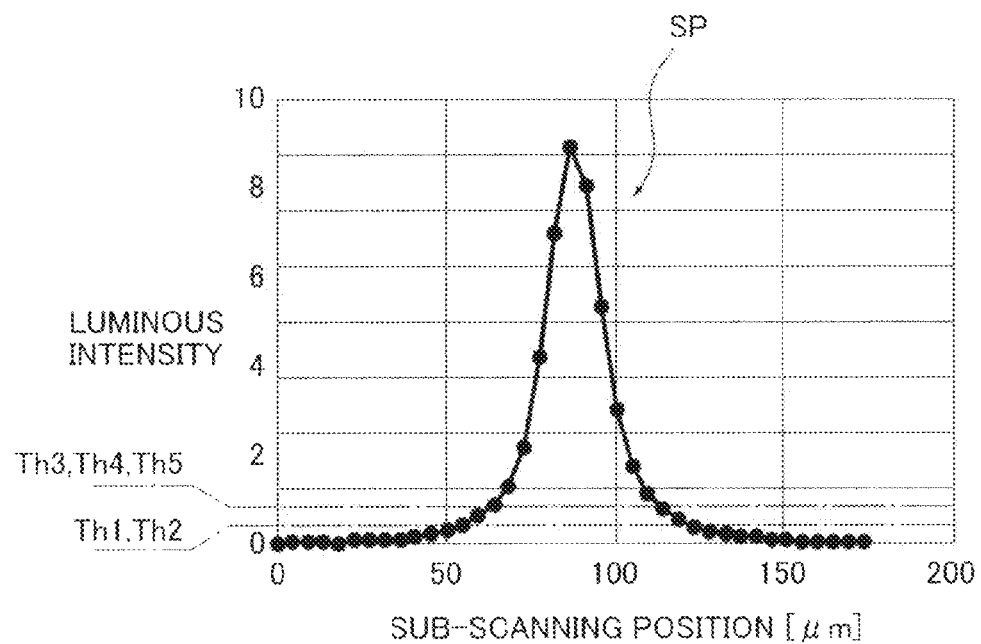
FIG. 8 is a graph showing a one-dimensional beam profile in a sub-scanning direction, wherein a lateral axis indicates a position [µm] in the sub-scanning direction, and a vertical axis indicates a luminous intensity.

In the method of manufacturing the print head according to the second embodiment, the second magnitude related data BS2 is found using the fourth threshold Th4 in the same way as in a case where the first magnitude related data BS is found using the second threshold Th2 (refer to FIG. 7 and FIG. 8). At this time, in the same way at the time of finding the first magnitude related data BS, the averaging processing may be executed using the second magnitude related data BS2 in the sequential light spots SP respectively. It should be noted that each of the second magnitude related data BS2 is preferably found in this manner in the same way at the time of finding the first magnitude related data BS, but in a case of finding the data showing the magnitude of the light spot SP, the method of finding the data is not limited to the method of the second embodiment, and the other method may be adopted therefor.

In addition, in the method of manufacturing the print head according to the second embodiment, the light quantity correction data CDk [%] is calculated by the following expression (2) as the light quantity correction data to each of the LEDs 35 forming the light spot SPk as a target. In the following expression (2), the first ratio data PDk, the first ratio average value $PD_{ave}$ and the proportional constant PC are similar to those in the expression (1) of the first embodiment. It should be noted that a sign "k" in the second magnitude related data BS2k is the aforementioned identifier ("k" is a natural number other than a zero) indicating which one of all the light spots SP is a target, and is a numeral equal to the sign "k" in the light spot SPk.

$$CD2k=\{(PDk/PD_{ave})-1\} \times PC+BS2k \times PC2 \qquad (2)$$

In this expression (2), PC2 is a proportional constant set besides the proportional constant PC. The proportional constant PC2 is appropriately set in accordance with an image formation process such as developing since the developing toner amount changes with a difference of the image formation process. In this way, the light quantity correction data CD2k is found by using the first ratio data PDk, in other words, is found by using the light power density (light quantity per area) in the light spot SPk as a target, as the first factor. In addition, the light quantity correction data CD2k is found by using the second magnitude related data BS2 of the light spot Sp as a target, that is, is found by using the second magnitude related data BS2 as the second factor.

Next, an explanation will be made of the processing for setting the light quantity correction data (light quantity correction value) in the method of manufacturing the print head according to the second embodiment of the present invention with reference to FIG. 13. FIG. 13 is a flow chart showing the processing for setting the light quantity correction data (light quantity correction value) in the method of manufacturing the print head according to the second embodiment. Hereinafter, an explanation will be made of each step (each process) of the flow chart in FIG. 13. A target to be executed in the flow chart in FIG. 13 will be the print head 30 assembled in the same way with the first embodiment.

In step S11, the measurement of all the light spots SPk formed in the print head 30 is performed, and the process goes to step S12. Step S11 is the same as step S1 in the flow chart in FIG. 9.

In step S12, subsequent to performing the measurement of all the light spots SPk formed in the print head 30 in step S11, the first light quantity related data PWk in all the light spots SPk is found, and the process goes to step S13. Step S12 is the same as step S2 in the flow chart in FIG. 9. Therefore step S12 becomes a first process of finding the first light quantity related data PW showing the light quantity in the light spot SP formed by lighting up the light-emitting unit (LED 35) by the driver IC 36 as the driving unit by using the first threshold Th1.

In step S13, subsequent to finding the first light quantity related data PWk in all the light spots SPk in step S12, the first magnitude related data BSk in all the light spots SPk is found, and the process goes to step S14. Step S13 is the same as step S3 in the flow chart in FIG. 9. Therefore step S13 becomes a second process of finding the first magnitude related data BS showing the magnitude in the light spot SP formed by lighting up the light-emitting unit (LED 35) by the driver IC 36 as the driving unit by using the second threshold Th2.

In step S14, subsequent to finding the first magnitude related data BSk in all the light spots SPk in step S13, the second magnitude related data BS2k (second factor) in all the light spots SPk is found, and the process goes to step S15. In step S14, as described above, the second magnitude related data BS2k in the light spot SPk is found using the fourth threshold Th4 to the measurement result of the measurement result as a target in step S11. In addition, in step S14, the second magnitude related data BS2k in all the light spots SPk is found by targeting all the light spots SPk. Therefore step S14 becomes a second process of finding the second magnitude related data BS2 showing the magnitude in the light spot SP formed by lighting up the light-emitting unit (LED 35) by the driver IC 36 as the driving unit by using the fourth threshold Th4. It should be noted that step S14, as long as between step S11 and step S18, may be executed after any step or at the same time with the other step, and is not limited to the configuration of the second embodiment. This is because step S14 uses the measurement result in step S11, and the found second magnitude related data BS2k is used in step S18.

In step S15, subsequent to finding the second magnitude related data BS2k in all the light spots SPk in step S14, the first ratio data PDk (first factor) in all the light spots SPk is found, and the process goes to step S16. Step S15 is the same as step S4 in the flow chart in FIG. 9. Therefore step S15 becomes a third process of finding the first ratio data PD showing the ratio between the first light quantity related data PW and the first magnitude related data BS.

In step S16, subsequent to finding the first ratio data PDk in all the light spots SPk in step S15, the first ratio average value $PD_{ave}$ is found, and the process goes to step S17. Step S16 is the same as step S5 in the flow chart in FIG. 9.

In step S17, subsequent to finding the first ratio average value $PD_{ave}$ in step S16, the light quantity correction data CD2k to each of the LEDs 35 is found, and the process goes to step S18. In step S17, the light quantity correction data CDk to each of the LEDs 35 forming the light spot SPk as a target is found by using the first ratio data PDk (first factor) found in step S15 and the second magnitude data BS2k (second factor) found in step S14. In step S17 of the second embodiment, the light quantity correction data CD2k [%] to each of the LEDs 35 is found by substituting the first ratio data PDk, the second magnitude related data BS2k and the first ratio average value $PD_{ave}$ found in step S16 to the aforementioned expression (2). Therefore step S17 becomes a fourth process of finding the light quantity correction data CD2 to the light-emitting unit (LED 35) forming the light spot SP as a target by using the first ratio data PD and the second magnitude related data BS2.

In step S18, subsequent to finding the light quantity correction data CD2k to each of the LEDs 35 in step S17, each of the light quantity correction data CD2k is recorded and retained in the print head 30 to complete the processing of setting the light quantity correction data (light quantity correction value). In step S18, each of the light quantity correction data CD2k found in step S17 is recorded and retained in the print head 30 to be capable of being referred to for driving each of the LEDs 35. In step S18 of the second embodiment, the light quantity correction data CD2k corresponding to the light spot SPk is stored in the memory 37 (refer to FIG. 1) of the driver IC 36 that drives the LED 35 forming the light spot SPk. Therefore step S18 becomes a fifth process of retaining the found light quantity correction data CD2 to the print head 30.

Figure 13:
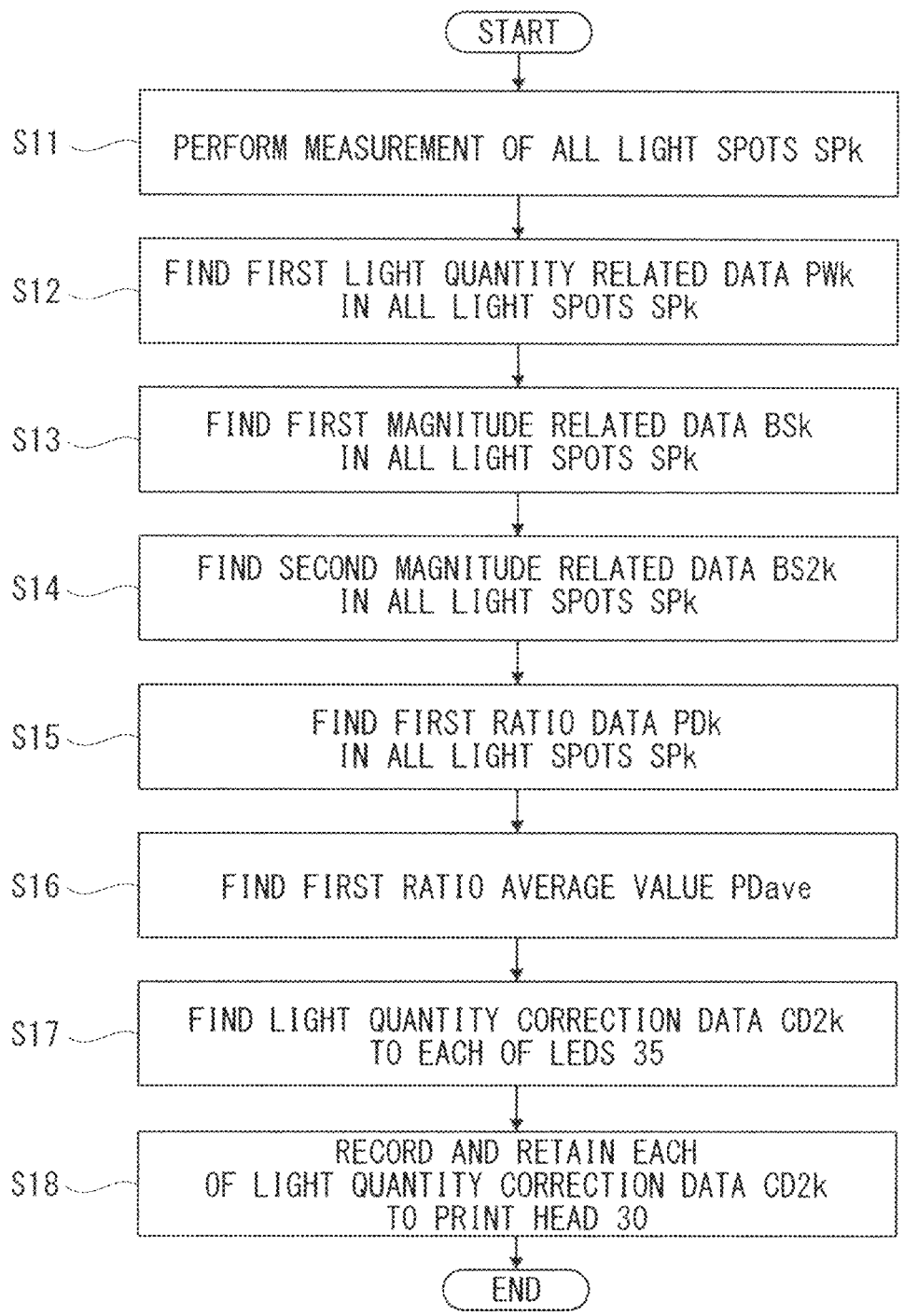
FIG. 13 is a flow chart showing processing of setting light quantity correction data (light quantity correction value) in a method of manufacturing a print head according to a second embodiment of the present invention.

In the method of manufacturing the print head according to the second embodiment of the present invention, after the print head 30 is assembled as described above, the processing of setting the light quantity correction data (light quantity correction value) is executed (refer to the flow chart in FIG. 13). In the flow chart in FIG. 13, the process goes to step S11, wherein each of the light spots SPk is formed on the field by the assembled print head 30 to measure each of the light spots SPk. After that, in the flow chart in FIG. 13, the process goes in the order of step S12, step S13, step S14 and step S15, and thereby the first ratio data PDk (first factor) as the ratio between the light quantity (or value closely related to the light quantity) and the magnitude in the light spot SPk is found by using the first light quantity related data PWk and the first magnitude related data BSk. The second magnitude related data BS2 (second factor) in the light spot SPk is found. In addition, in the flow chart in FIG. 13, the process goes to step S16 and then, step S17, and thereby the light quantity correction data CD2k to each of the LEDs 35 forming the light spot SPk is found by using the first ratio data PDk (first factor) and the second magnitude related data BS2 (second factor) in the light spot SPk as a target. After that, in the flow chart in FIG. 13, the process goes to step S18, wherein the light quantity correction data CD2k found corresponding to the light spot SPk formed by the LED 35 is stored in the memory 37 of the driver IC 36 driving each of the LEDs 35.

As a result, the method of manufacturing the print head according to the second embodiment of the present invention can manufacture the print head 30 in which the light quantity correction data CD2k set as described above is stored in the memory 37 of each of the drivers IC 36 corresponding to each of the LEDs 35. Therefore in the print head 30 formed by the method of manufacturing the print head according to the second embodiment, each of the drivers IC 36 drives each of the LEDs 35 by using the light quantity correction data CD2k set as described above and stored in the memory 37 (refer to FIG. 1). Therefore, the print head 30 formed by the method of manufacturing the print head according to the second embodiment can appropriately prevent the generation of the longitudinal streak in the formed image. This is achieved because of the following configuration.

In the method of manufacturing the print head according to the second embodiment, the first ratio data PDk in the light spot SP formed by each of the LEDs 35 is made to the first factor, and the second magnitude related data BS2 as the data showing the magnitude of each of the light spot SPk is made to the second factor. In the method of manufacturing the print head according to the second embodiment, the light quantity correction data CD2 set using the first ratio data PDk (first factor) and the second magnitude related data BS2 (second factor) is stored in the memory 37 to manufacture the print head 30. Therefore in the print head 30, each of the LEDs 35 is driven by using the light quantity correction data CD2 stored in the memory 37, and thereby the developing toner amount to be determined depending upon the light power density in the light from each of the LEDs 35 can be more finely adjusted. Therefore, in the print head 30, it is possible to appropriately prevent the generation of the longitudinal streak (density unevenness) on the image.

Since the method of manufacturing the print head according to the second embodiment basically has the same configuration with the method of manufacturing the print head according to the first embodiment, it can basically obtain the effect similar to that of the first embodiment.

In addition, in the method of manufacturing the print head according to the second embodiment, the light quantity correction data CD2k is set using the second magnitude related data BS2 (second factor) that is the data showing the magnitude of each of the light spots SPk in addition to the first ratio data PDk (first factor). Therefore in the method of manufacturing the print head, the light quantity correction data CD2k can be set considering the magnitude of the light spot SPk formed by each of the LEDs 35 in addition to the light power density (light quantity per area) in the light from each of the LEDs 35. Thereby in the method of manufacturing the print head, it is possible to set the light quantity correction data CD2k that can more finely adjust the developing toner amount. As a result, in the method of manufacturing the print head, the set light quantity correction data CD2k is used to correct the light quantity of the light emitted from each of the light sources (each of the LEDs 35), and thereby it is possible to manufacture the print head 30 that more appropriately prevents the generation of the longitudinal streak (density unevenness).

Accordingly, the method of manufacturing the print head according to the second embodiment of the present invention can manufacture the print head 30 that can appropriately prevent the generation of the longitudinal streak.

It should be noted that in the method of manufacturing the print head according to the second embodiment, a first item using the first ratio data PDk (first factor) and a second item using the second magnitude related data BS2 (second factor) are added in the expression (2) for finding the light quantity correction data CD2k. However, in the method of manufacturing the print head, use of the first ratio data PDk (first factor) as the ratio of the light quantity and the magnitude in the light spot SP formed by each of the light sources (each of the LEDs 35) and the second magnitude related data BS2 (second factor) as the data showing the magnitude of each of the light spots SPk is only required, and the method is not limited to the configuration of the second embodiment. An example of this may include a method of multiplying the first item using the first ratio data PDk (first factor) by the second item using the second magnitude related data BS2 (second factor).

In the method of manufacturing the print head according to the second embodiment, the second magnitude related data BS2 (second factor) is used, but the second light quantity related data PW2 of the light spot SPk as a target may be used as a second factor, and the second factor is not limited to the configuration of the second embodiment. The second light quantity related data PW2 is, as similar to the second magnitude related data BS2, found apart from the first light quantity related data PW of finding the first ratio data PD (first factor).

The second light quantity related data PW2 (second factor) shows the data showing the light quantity in the light spot SPk finding the first ratio data PD (first factor) to be targeted or data closely related to the light quantity in the light spot SPk. In the method of manufacturing the print head, the third threshold Th3 (refer to FIG. 7 and FIG. 8) finding the second light quantity related data PW2 is set. The third threshold Th3 defines the lower limit value in intensity used for finding the first light quantity related data PW in the one-dimensional beam profiles in the two scanning directions as similar to the first threshold Th1, and is set to the value different from the first threshold Th1. The third threshold Th3 may be set as needed corresponding to each of the light spots SP to be formed. It should be noted that the third threshold Th3 may be set as a zero (0% in the peak intensity of the light spot SP) as similar to the first threshold Th1. In this case, the second light quantity related data PW2 is to be found using all the values of the intensity distribution measured as the light spot SP, that is, as similar to a case of substantially not providing the third threshold Th3. The second light quantity related data PW2 is found using the third threshold Th3 in the same way as a case of finding the first light quantity related data PW using the first threshold Th1 (refer to FIG. 7 and FIG. 8). At this time, in the same way at the time of finding the first light quantity related data PW, the averaging processing may be executed using the second light quantity related data PW2 in the sequential light spots SP respectively. It should be noted that each of the second light quantity related data PW2 is preferably found in this manner in the same way at the time of finding the first light quantity related data PW, but when finding the data showing the magnitude of the light spot SP, the method of finding the data is not limited to the method of the second embodiment, and the other method may be adopted therefor. In this case, it is possible to set the light quantity correction data CD2$k$ in consideration of the light power density (light quantity per area) in the light from each of the LEDs 35 as well as the light quantity of the light spot SPk formed by each of the LEDs 35. Therefore the method of manufacturing the print head can set the light quantity correction data CD2$k$ that can more finely adjust the developing toner amount.

Further, in the method of manufacturing the print head according to the second embodiment, the second magnitude related data BS2 is used, but the second light quantity related data PW2 of the light spot SPk to be targeted in addition to the second magnitude related data BS2 may be used, and this data is not limited to that of the second embodiment. The second light quantity related data PW2 is the same as the above-mentioned. In this case, it is possible to set the light quantity correction data CD2$k$ in consideration of the light power density (light quantity per area) in the light from each of the LEDs 35 as well as the light quantity and magnitude of the light spot SPk formed by each of the LEDs 35. Therefore the method of manufacturing the print head can set the light quantity correction data CD2$k$ that can more finely adjust the developing toner amount.

Third Embodiment

An explanation will be made of a method of manufacturing a print head according to a third embodiment of the present invention, a print head 30 of the third embodiment manufactured by the method of manufacturing the print head, and an image forming apparatus 10 of the third embodiment provided with the print head 30 with reference to FIG. 14. The method of manufacturing the print head according to the third embodiment is an example where a method of setting light quantity correction data (light quantity correction value) is different from the method of setting the light quantity correction data (light quantity correction value) according to each of the first embodiment and the second embodiment. The method of manufacturing the print head according to the third embodiment has a basic concept and configuration (process) that are similar to those in the method of manufacturing the print head according to the first embodiment, and therefore components in the concept and configuration identical to those in the first embodiment are referred to as identical signs, and the detailed explanation is omitted.

In the method of setting light quantity correction data (light quantity correction value) in the method of manufacturing the print head according to the third embodiment, a first threshold Th1 and a second threshold Th2 are used to find first ratio data PD (factor (hereinafter, referred to as "first factor")), and a third threshold Th3 and a fourth threshold Th4 are used to find second ratio data PD2 (factor (hereinafter, referred to as "second factor")). The third threshold Th3 and the fourth threshold Th4 are similar to those of the second embodiment. The second ratio data PD2 is data showing a ratio between the light quantity and the magnitude found based upon a threshold different from the first ratio data PD (first factor) in the light spot SPk finding the first ratio data PD to be targeted.

In the method of manufacturing the print head according to the third embodiment, second light quantity related data PW2 is found using the third threshold Th3 in the same way as a case of finding the first light quantity related data PW using the first threshold Th1 (refer to FIG. 7 and FIG. 8). At this time, in the same way at the time of finding the first light quantity related data PW, the averaging processing may be executed using the second light quantity related data PW2 in the sequential light spots SP respectively. It should be noted that each of the second light quantity related data PW2 is preferably found in this manner in the same way at the time of finding the first light quantity related data PW, but when finding the data showing the light quantity of the light spot SPk or the data closely related to the light quantity of the light spot SPk, the method of finding the second light quantity related data PW2 is not limited to the method of the third embodiment, and the other method may be adopted therefor.

In the method of manufacturing the print head according to the third embodiment, second magnitude related data BS2 is found using the fourth threshold Th4 in the same way as a case of finding the first magnitude related data BS using the second threshold Th2 (refer to FIG. 7 and FIG. 8). At this time, in the same way at the time of finding the first magnitude related data BS, the averaging processing may be executed using the second magnitude related data BS2 in the sequential light spots SP respectively. It should be noted that each of the second magnitude related data BS2 is preferably found in this manner in the same way at the time of finding the first magnitude related data BS, but when finding the data showing the magnitude of the light spot SP, the method of finding the second magnitude related data BS2 is not limited to the method of the third embodiment, and the other method may be adopted therefor.

In the method of manufacturing the print head according to the third embodiment, a ratio between the second light quantity related data PW2 and the second magnitude related data BS2 found as described above is found, which is made to the second ratio data PD2. In the third embodiment, the second ratio data PD2 is made to a ratio of the second light quantity related data PW2 to the second magnitude related data BS2 (PD2=PW2/BS2). Therefore the second ratio data PD2 becomes a value (amount) equivalent to the light power density (light quantity per area) found by a threshold different from the first ratio data PD in the light spot SP as a target. Form this point, the second ratio data PD2 becomes a second factor for setting the light quantity correction data in the method of manufacturing the print head according to the third embodiment. It should be noted that the second ratio data PD2 (second factor) that is the ratio between the second light quantity related data PW2 and the second magnitude related data BS2 may be made to a ratio of the second magnitude related data BS2 to the second light quantity related data PW2 (PD2=BS2/PW2), and is not limited to the third embodiment as described above. In this case, the second ratio data (second factor) shows an inverse number of the light power density (light quantity per area). In this manner, in the method of manufacturing the print head according to the third embodiment, it is possible to find the ratio (second ratio data PD2 (second factor)) between the light quantity (or value closely related to the light quantity) and the magnitude in the light spot SP formed by the each of the LEDs 35.

In the method of manufacturing the print head according to the third embodiment, for setting the light quantity correction data by using this ratio (second ratio data PD2 (second factor)), a ratio (second ratio data PD2$k$ (second factor)) in each of all the light spots SPk is found as similar to the above-mentioned. In addition, in the method of manufacturing the print head, an average value of the second ratio data PD2$k$ in all the light spots SPk is found to find a second ratio average value PD2$_{ave}$. In addition, in the method of manufacturing the print head according to the third embodiment, light quantity correction data CD3$k$ [%] is calculated by the following expression (3) as the light quantity correction data to each of the LEDs 35 forming the light spot SPk as a target. In the following expression (3), the first ratio data PDk, the first ratio average value PD$_{ave}$ and the proportional constant PC are similar to those in the following expression (1) of the first embodiment and the following expression (2) of the second embodiment. It should be noted that a sign "k" in the second ratio data PD2$k$ is the aforementioned identifier ("k" is a natural number other than a zero) indicating which one of all the light spots SP is a target, and is a numeral equal to the sign "k" in the light spot SPk.

$$CD3k=\{(PDk/PD_{ave})-1\}\times PC+\{(PD2k/PD2_{ave})-1\}\times PC2 \quad (3)$$

In this expression (3), PC2 is a proportional constant set apart from the proportional constant PC. The proportional constant PC is as needed set in accordance with an image formation process such as developing since the developing tonner amount changes by a difference of the image formation process. In this way, the light quantity correction data CD3$k$ is found using the first ratio data PDk, in other words, using the light power density in the light spot SPk as a target as the first factor. In addition, the light quantity correction data CD3$k$ is found using the second ratio data PD2$k$ found by a threshold different from the first ratio data PDk in the light spot Sp as a target, that is, using the light power density in the light spot SPk as a target, as the second factor.

Next, an explanation will be made of the processing for setting the light quantity correction data (light quantity correction value) in the method of manufacturing the print head according to the third embodiment of the present invention with reference to FIG. 14. FIG. 14 is flow chart showing the processing for setting the light quantity correction data (light quantity correction value) in the method of manufacturing the print head according to the third embodiment. Hereinafter, an explanation will be made of each step (each process) of the flow chart in FIG. 14. A target to be executed in the flow chart in FIG. 14 will be the print head 30 assembled in the same way with the first embodiment.

In step S21, the measurement of all the light spots SPk formed in the print head 30 is performed, and the process goes to step S22. Step S21 is the same as step S1 in the flow chart in FIG. 9.

In step S22, subsequent to performing the measurement of all the light spots SPk formed in the print head 30 in step S21, first light quantity related data PWk in all the light spots SPk is found, and the process goes to step S23. Step S22 is the same as step S2 in the flow chart in FIG. 9. Therefore step S22 becomes a first process of finding the first light quantity related data PW showing the light quantity in the light spot SP formed by lighting up the light-emitting unit (LED 35) by the driver IC 36 as the driving unit by using the first threshold Th1.

In step S23, subsequent to finding the first light quantity related data PWk in all the light spots SPk in step S22, second light quantity related data PW2$k$ in all the light spots SPk is found, and the process goes to step S24. In step S23, as described above, the second light quantity related data PW2 in the light spots SPk is found by using the third threshold Th3 to the measurement result of the light spot SPk as a target in step S21. In step S23, the second light quantity related data PW2$k$ in all the light spots SPk is found by targeting all the light spots SPk. Therefore step S23 becomes a first process of finding the second light quantity related data PW2 showing the light quantity in the light spot SP formed by lighting up the light-emitting unit (LED 35) by the driver IC 36 as the driving unit by using the third threshold Th3.

In step S24, subsequent to finding the second light quantity related data PW2$k$ in all the light spots SPk in step S23, first magnitude related data BSk in all the light spots SPk is found, and the process goes to step S25. Step S24 is the same as step S3 in the flow chart in FIG. 9. Therefore step S24 becomes a second process of finding the first magnitude related data BS showing the magnitude in the light spot SP formed by lighting up the light-emitting unit (LED 35) by the driver IC 36 as the driving unit by using the second threshold Th2.

In step S25, subsequent to finding the first magnitude related data BSk in all the light spots SPk in step S24, second magnitude related data BS2$k$ in all the light spots SPk is found, and the process goes to step S26. In step S25, as described above, the second magnitude related data BS2$k$ in the light spot SPk is found using the fourth threshold Th4 to the measurement result in the light spot SPk as a target in step S21. In step S25, the second magnitude related data BS2$k$ in all the light spots SPk is found by targeting all the light spots SPk. Therefore step S25 becomes a second process of finding the second magnitude related data BS2 showing the magnitude in the light spot SP formed by lighting up the light-emitting unit (LED 35) by the driver IC 36 as the driving unit by using the fourth threshold Th4. It should be noted that step S22 to step S25 may be executed by any order, and is not limited to the configuration of the third embodiment.

In step S26, subsequent to finding the second magnitude related data BS2$k$ in all the light spots SPk in step S25, first ratio related data PDk (first factor) in all the light spots SPk is found, and the process goes to step S27. Step S26 is the same as step S4 in the flow chart in FIG. 9. Therefore step S26 becomes a third process of finding the first ratio data PD showing the ratio between the first light quantity related data PW and the first magnitude related data BS.

In step S27, subsequent to finding the first ratio data PDk (first factor) in all the light spots SPk in step S26, second ratio data PD2$k$ in all the light spots SPk is found, and the process goes to step S28. In step S27, for setting the light quantity correction data, the second ratio data PD2$k$ as the ratio between the second light quantity related data PW2$k$ found in step S23 and the second magnitude related data BS2$k$ found in step S25 in all the light spots SP$k$ is found. That is, in step S27, a value (amount) equivalent to the light power density in all the light spots SP$k$ is found by a threshold different from that in step S26. In step S27 of the third embodiment, as described above, the second ratio data PD2$k$ in all the light spots SP$k$ is found as the ratio of the second light quantity related data PW2$k$ to the second magnitude related data BS2$k$ (PD2$k$=PW2$k$/BS2$k$). Therefore step S27 becomes a third process of finding the second ratio data PD2 showing the ratio between the second light quantity related data PW2 and the second magnitude related data BS2. It should be noted that step S27 may be executed at the same time with step S26 or before step S26, and is not limited to the configuration of the third embodiment.

In step S28, subsequent to finding the second ratio data PD2 in all the light spots SP$k$ in step S27, a first ratio average value PD$_{ave}$ is found, and the process goes to step S29. Step S28 is the same as step S5 in the flow chart in FIG. 9.

In step S29, subsequent to finding the first ratio average value PD$_{ave}$ in step S28, a second ratio average value PD2$_{ave}$ is found, and the process goes to step S30. In step S29, as described above, an average value of the second ratio data PD2$k$ in all the light spots SP$k$ found in step S27 is found, which is made to the second ratio average value PD2$_{ave}$.

In step S30, subsequent to finding the second ratio average value PD2$_{ave}$ in step S29, the light quantity correction data CD3$k$ to each of the LEDs 35 is found, and the process goes to step S31. In step S30, the light quantity correction data CD3$k$ to each of the LEDs 35 forming the light spot SP$k$ as a target is found by using the first ratio data PD$k$ (first factor) found in step S26 and the second ratio data PD2$k$ (second factor) found in step S27. In step S30 of the third embodiment, the light quantity correction data CD3$k$ [%] to each of the LEDs 35 is found by substituting the first ratio data PD$k$, the second ratio data PD2$k$, the first ratio average value PD$_{ave}$ found in step S28 and the second ratio average value PD2$_{ave}$ found in step S29 to the aforementioned expression (3). Therefore step S30 becomes a fourth process of finding the light quantity correction data CD3 to the light-emitting unit (LED 35) forming the light spot SP as a target by using the first ratio data PD and the second ratio data PD2.

In step S31, subsequent to finding the light quantity correction data CD3$k$ to each of the LEDs 35 in step S30, each of the light quantity correction data CD3$k$ is recorded and retained in the print head 30 to complete the processing of setting the light quantity correction data (light quantity correction value). In step S31, each of the light quantity correction data CD3$k$ found in step S30 is recorded and retained in the print head 30 to be capable of being referred to for driving each of the LEDs 35. In step S31 of the third embodiment, the light quantity correction data CD3$k$ corresponding to the light spot SP$k$ is stored in the memory 37 (refer to FIG. 1) of the driver IC 36 that drives the LED 35 forming the light spot SP$k$. Therefore step S31 becomes a fifth process of retaining the found light quantity correction data CD3 to the print head 30.

Figure 14:
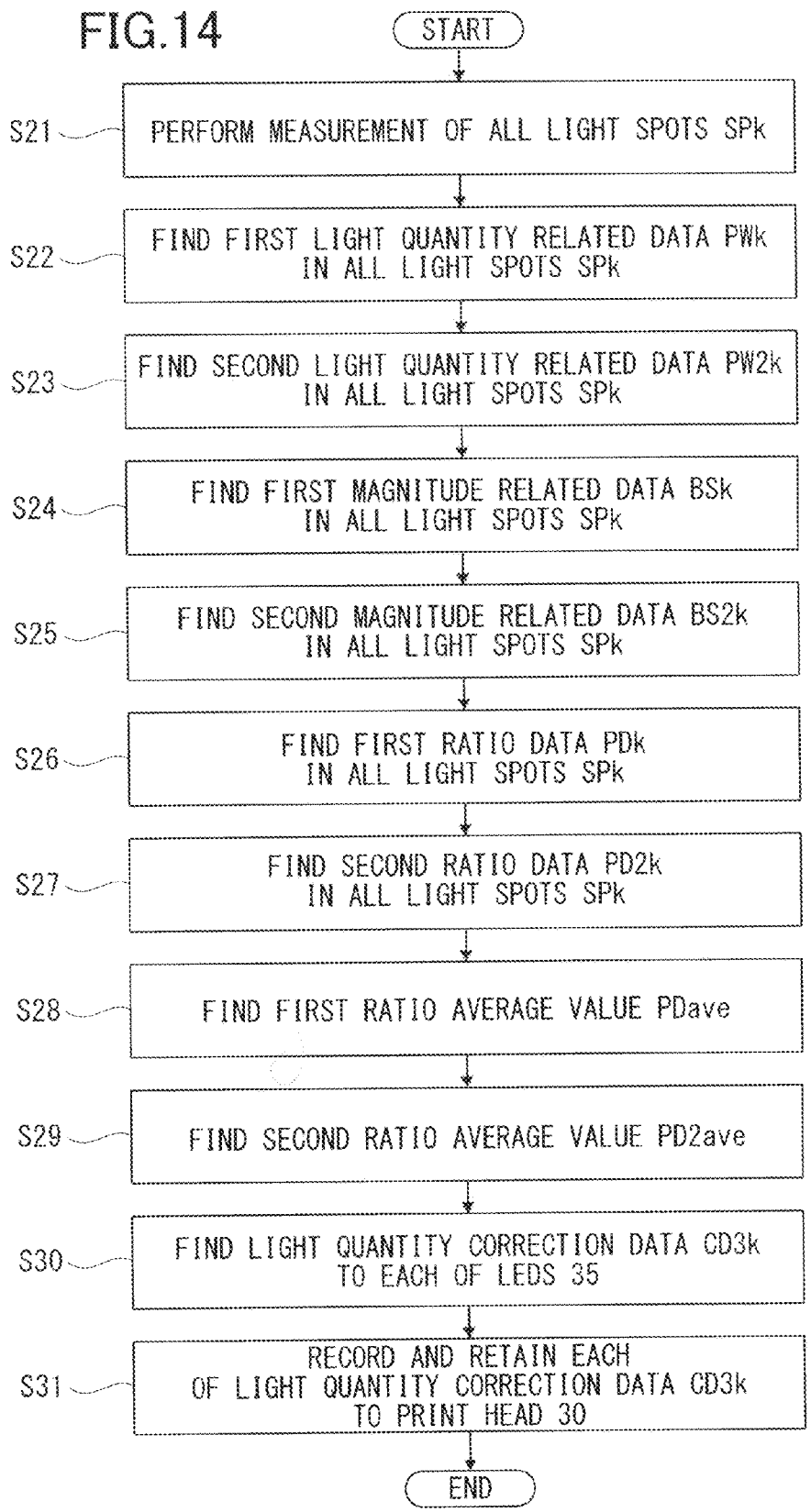
FIG. 14 is a flow chart showing processing of setting light quantity correction data (light quantity correction value) in a method of manufacturing a print head according to a third embodiment of the present invention.

In the method of manufacturing the print head according to the third embodiment of the present invention, after the print head 30 is assembled as described above, the processing of setting the light quantity correction data (light quantity correction value) is executed (refer to the flow chart in FIG. 14). In the flow chart in FIG. 14, the process goes to step S21, wherein each of the light spots SP$k$ is formed on the field in the assembled print head 30 to measure each of the light spots SP$k$. After that, in the flow chart in FIG. 14, the process goes in the order of step S22, step S23, step S24, step S25 and step S26, and thereby the first ratio data PD$k$ (first factor) as the ratio between the light quantity (or value closely related to the light quantity) and the magnitude in the light spot SP$k$ is found by using the first light quantity related data PW$k$ and the first magnitude related data BS$k$. In addition, in the flow chart in FIG. 14, the process goes to step S27, wherein the second ratio data PD2$k$ (second factor) as the ratio between the light quantity (or value closely related to the light quantity) and the magnitude in the light spot SP$k$ is found by using the second light quantity related data PW2 and the second magnitude related data BS2. In the flow chart in FIG. 14, the process goes in the order of step S28, step S29 and step S30, and thereby the light quantity correction data CD3$k$ to each of the LEDs 35 forming the light spot SP$k$ is found by using the first ratio data PD$k$ (first factor) and the second ratio data PD2$k$ (second factor) in the light spot SP$k$ as a target. After that, in the flow chart in FIG. 14, the process goes to step S31, wherein the light quantity correction data CD3$k$ found corresponding to the light spot SP$k$ formed by the LED 35 is stored in the memory 37 of the driver IC 36 that drives each of the LEDs 35.

As a result, the method of manufacturing the print head according to the third embodiment of the present invention can manufacture the print head 30 in which the light quantity correction data CD3$k$ set as described above is stored in the memory 37 of each of the drivers IC 36 corresponding to each of the LEDs 35. Therefore in the print head 30 formed by the method of manufacturing the print head according to the third embodiment, each of the drivers IC 36 drives each of the LEDs 35 by using the light quantity correction data CD3$k$ set as described above and stored in the memory 37 (refer to FIG. 1). Therefore, the print head 30 formed by the method of manufacturing the print head according to the third embodiment can appropriately prevent the generation of the longitudinal streak in the formed image. This is achieved by the following configuration.

In the method of manufacturing the print head according to the third embodiment, the first ratio data PD$k$ in the light spot Sp formed by each of the LEDs 35 is made to a first factor, and the second ratio data PD2$k$ of the light spot SP$k$ forming each of the LEDs 35 is made to a second factor. In the method of manufacturing the print head according to the third embodiment, the light quantity correction data CD2 set using the first ratio data PD$k$ (first factor) and the second ratio data PD2$k$ (second factor) is stored in the memory 37 to manufacture the print head 30. Therefore in the print head 30, each of the LEDs 35 is driven by using the light quantity correction data CD2 stored in the memory 37, and thereby the developing toner amount to be determined depending upon the light power density in the light from each of the LEDs 35 can be more finely adjusted. This is because the beam profile of the light spot SP formed by each of the LEDs 35 is not formed in a flat top shape, but in a shape close to a Gauss distribution, the light power density is found using a different threshold, thereby making it possible for the light power density to be more appropriately close to an actual light power density. Therefore, the print head 30 can appropriately prevent the generation of the longitudinal streak (density unevenness) on the image.

Since the method of manufacturing the print head according to the third embodiment basically has the same configuration with the method of manufacturing the print head according to the first embodiment, it can basically obtain the effect similar to that of the first embodiment.

In addition thereto, in the method of manufacturing the print head according to the third embodiment, the light quantity correction data CD3$k$ is set using the second ratio data PD2$k$ (second factor) in the light spot SP formed by the each of the LEDs 35 in addition to the first ratio data PD$k$ (first factor). In other words, in the method of manufacturing the print head, the light quantity correction data CD3$k$ is set using the ratio data (PD$k$ and PD2$k$) in the light spot SP that is found using the two different thresholds and is formed by the each of the LEDs 35. Thereby it is possible to more appropriately find the light power density in the light from each of the LEDs 35 to set the light quantity correction data CD3$k$ with the more appropriate light power density. Thereby the method of manufacturing the print head can set the light quantity correction data CD3$k$ that can more finely adjust the developing toner amount. As a result, in the method of manufacturing the print head, the set light quantity correction data CD3$k$ is used to correct the light quantity of the light emitted from each of the light sources (each of the LEDs 35), and thereby it is possible to manufacture the print head 30 that more appropriately prevents the generation of the longitudinal streak (density unevenness).

Accordingly, the method of manufacturing the print head according to the third embodiment of the present invention can manufacture the print head 30 that can appropriately prevent the generation of the longitudinal streak.

It should be noted that in the method of manufacturing the print head according to the third embodiment, a first item using the first ratio data PD$k$ (first factor) and a second item using the second ratio data PD2$k$ (second factor) are added in the expression (3) for finding the light quantity correction data CD3$k$. However, in the method of manufacturing the print head, use of the first ratio data PD$k$ (first factor) as the ratio of the light quantity and the magnitude in the light spot SP formed by each of the light sources (each of the LEDs 35) and the second ratio data PD2$k$ (second factor) as the ratio of the light quantity and the magnitude in the light spot SP formed by each of the light sources (each of the LEDs 35), which is found with a threshold different from the first ratio data PD$k$ is only required, and the method of finding the light quantity correction data CD3$k$ is not limited to the configuration of the third embodiment. An example of this may include a method of multiplying the first item using the first ratio data PD$k$ (first factor) by the second item using the second ratio data PD2$k$ (second factor). Further, another example thereof may include a combination of the first item and the second item according to a different expression or a change in use of the first ratio data PD$k$ (first factor) and the second ratio data PD2$k$ (second factor).

Fourth Embodiment

An explanation will be made of a method of manufacturing a print head according to a fourth embodiment of the present invention, a print head 30 of the fourth embodiment manufactured by the method of manufacturing the print head, and an image forming apparatus 10 of the fourth embodiment provided with the print head 30 with reference to FIG. 15. The method of manufacturing the print head according to the fourth embodiment is an example where a method of setting light quantity correction data (light quantity correction value) is different from the method of setting the light quantity correction data (light quantity correction value) according to each of the first embodiment, second embodiment and third embodiment. The method of manufacturing the print head according to the fourth embodiment has a basic concept and configuration (process) that are similar to those in the method of manufacturing the print head according to the first embodiment described above, and therefore components in the concept and configuration identical to those in the first embodiment are referred to as identical signs, and the detailed explanation is omitted.

In the method of setting the light quantity correction data (light quantity correction value) in the method of manufacturing the print head according to the fourth embodiment, the light quantity is corrected to be constant before finding a first ratio data PD, that is, first light quantity related data PW and first magnitude related data BS. That is, in the method of manufacturing the print head according to the fourth embodiment, the driver IC 36 drives each of LEDs 35 in such a manner that the light quantity in each of all the light spots SP$k$ is constant, to form a light spot SP$k$. In the method of manufacturing the print head according to the fourth embodiment, all the light spots SP$k$ formed such that the light quantity of each is constant are measured to find the first light quantity related data PW and first magnitude related data BS, from which the first ratio data PD is found.

Therefore in the method of manufacturing the print head according to the fourth embodiment, the correction of making the light quantity constant is made as follows. First, a fifth threshold Th5 (refer to FIG. 7 and FIG. 8) of finding third light quantity related data PW3 used in the correction of making the light quantity constant is set. The fifth threshold Th5 defines a lower limit value in intensity used for finding the third light quantity related data PW3 in one-dimensional beam profiles in the two scanning directions as similar to the first threshold Th1. The fifth threshold Th5 may be set to a value equal to the first threshold Th1 or to a value different from the first threshold Th1, and may be set as needed corresponding to each of the light spots SP to be formed. It should be noted that the fifth threshold Th5 may be set as a zero (0% of a peak intensity of the light spot SP) as similar to the first threshold Th1. In this case, the third light quantity related data PW3 is to be found using all the values of the intensity distribution measured as the light spot SP, that is, as similar to a case of substantially not providing the fifth threshold Th5.

In addition, in the print head 30, the driver IC 36 drives each of the LEDs 35 without using any light quantity correction data to emit light from each of the LEDs 35 and form a light spot SP on a field by collecting the light by the lens array 32. An intensity distribution of the light spot SP formed on the field is measured. In the fourth embodiment, two-dimensional beam profiles of the light spots SP (refer to FIG. 5) are obtained. Thereafter, the third light quantity related data PW3 in the light spot SP is found using the fifth threshold Th5 based upon the measurement result of the light spot SP, in the same way with the first light quantity related data PW. At this time, in the same way at the time of finding the first light quantity related data PW, the averaging processing may be executed using the third light quantity related data PW3 in the sequential light spots SP respectively. It should be noted that the third light quantity related data PW3, as long as the method of finding the data closely related to the light quantity of the light spot SP is used, may be found with the method different from that of the fourth embodiment, and the method of finding the third light quantity related data PW3 is not limited to the method of the fourth embodiment.

Next, constant light quantity correction data CDf$k$ [%] to each of the LEDs 35 forming the light spot SP$k$ as a target is found such that all the third light-related data PW3$k$ are constant. It should be noted that a sign "k" in the third light quantity related data PW3$k$ and the constant light quantity correction data CDf$k$ is the aforementioned identifier ("k" is a natural number other than a zero) indicating which one of all the light spots SP is a target, and is a numeral equal to the sign "k" in the light spot SPk. The constant light quantity correction data CDfk can be found according to a general method. In addition, in the print head 30, the driver IC 36 drives each of the LEDs 35 by using the constant light quantity correction data CDfk to emit light from each of the LEDs 35 and form a light spot SP on a field by collecting the light by the lens array 32. Therefore all the light spots SPk where the light quantity of each is made constant can be formed on the field.

In the method of setting the light quantity correction data (light quantity correction value) in the method of manufacturing the print head according to the fourth embodiment, all the light spots SPk where the light quantity of each is made constant are measured, and the first light quantity related data PW and the first magnitude related data BS are found based upon the measurement result as similar to the first embodiment. In the method of manufacturing the print head according to the fourth embodiment, the ratio between the first light quantity related data PW and the first magnitude related data BS is found, which is made to the first ratio data PD. In the fourth embodiment, the first ratio data PD is made to the ratio of the first light quantity related data PW to the first magnitude related data BS (PD=PW/BS). Therefore the first ratio data PD is the value (amount) equivalent to the light power density (light quantity per area) in the light spot as a target out of all the light spots SPk where the light quantity of each is made constant. From this point, the first ratio data PD becomes a factor for setting the light quantity correction data in the method of manufacturing the print head according to the fourth embodiment. It should be noted that the first ratio data PD that is the ratio between the first light quantity related data PW and the first magnitude related data BS may be made to a ratio of the first magnitude related data BS to the first light quantity related data PW (PD=BS/PW), and is not limited to the fourth embodiment as described above. In this case, the first ratio data (factor) shows an inverse number of the light power density (light quantity per area).

In the method of manufacturing the print head according to the fourth embodiment, for setting the light quantity correction data by using this ratio (first ratio data PD (factor)), a ratio (first ratio data PDk (factor)) in each of all the light spots SPk is found as similar to the above-mentioned. In addition, in the method of manufacturing the print head, an average value of the first ratio data PSk in all the light spots SPk is found to find a first ratio average value $PD_{ave}$. In addition, in the method of manufacturing the print head according to the fourth embodiment, light quantity correction data CD4k [%] is calculated by the following expression (4) as the light quantity correction data to each of the LEDs 35 forming the light spot SPk as a target. In the following expression (4), the first ratio data PDk, the first ratio average value $PD_{ave}$ and the proportional constant PC are similar to those in the following expression (1) of the first embodiment, the following expression (2) of the second embodiment and the following expression (3) of the third embodiment.

$$CD4k = \{(PDk/PD_{ave}) - 1\} \times PC + CDfk \quad (4)$$

In this way, the light quantity correction data CD4k is found using the first ratio data PDk, in other words, using the light power density in the light spot SPk as a target out of all the light spots SP where the light quantity of each is made constant as the factor (hereinafter, referred to as "first factor"). In addition, the light quantity correction data CD4k of the fourth embodiment is found using the constant light quantity correction data CDfk used of making the light quantity of each of all the light spots SP constant as the second factor.

Next, an explanation will be made of the processing for setting the light quantity correction data (light quantity correction value) in the method of manufacturing the print head according to the fourth embodiment of the present invention with reference to FIG. 15. FIG. 15 is a flow chart showing the processing for setting the light quantity correction data (light quantity correction value) in the method of manufacturing the print head according to the fourth embodiment. Hereinafter, an explanation will be made of each step (each process) of the flow chart in FIG. 15. A target to be executed in the flow chart in FIG. 15 will be the print head 30 assembled in the same way with the first embodiment.

In step S41, subsequent to performing the measurement of all the light spots SPk formed in the print head 30, the process goes to step S42. In step S41, as described above, the driver IC 36 drives each of the LEDs 35 without using any light quantity correction data to measure each of the light spots SPk formed on the field. In step S41 of the fourth embodiment, a single LED 35 is lit up to form each of the light spots SPk to obtain the two-dimensional beam profile of each of the light spots SPk (refer to FIG. 5).

In step S42, subsequent to performing the measurement of all the light spots SPk formed in the print head 30 in step S41, the third light quantity related data PW3k in all the light spots SPk is found, and the process goes to step S43. In step S42, as described above, the third light quantity related data PW3 in the light spots SPk is found by using the fifth threshold Th5 to the measurement result of the light spot SPk as a target in step S41. In step S42, the third light quantity related data PW3k in all the light spots SPk is found by targeting all the light spots SPk. Therefore step S42 becomes a sixth process of finding the third light quantity related data PW3 showing the light quantity in the light spot SP formed by lighting up the light-emitting unit (LED 35) by the driver IC 36 as the driving unit by using the fifth threshold Th5.

In step S43, subsequent to finding the third light quantity related data PW3k in all the light spots SPk in step S42, the constant light quantity correction data CDfk to each of the LEDs 35 is found, and the process goes to step S44. In step S43, the constant light quantity correction data CDfk [%] to each of the LEDs 35 forming the light spot SPk as a target is found such that each of the third light related data PW3k found in step S42 is made constant. Therefore step S43 becomes a seventh process of finding the constant light quantity correction data CDf to the light-emitting unit (LED 35) forming the light spot SP as a target to make the third light quantity related data PW3 constant.

In step S44, subsequent to finding the constant light quantity correction data CDfk to each of the LEDs 35 in step S43, the measurement of all the light spots SPk formed as the constant light quantity in the print head 30 is made, and the process goes to step S45. In step S44, as described above, the driver IC 36 drives each of the LEDs 35 by using the constant light quantity correction data CDfk found in step S43 to measure each of the light spots SPk formed on the field. In step S44 of the fourth embodiment, the single LED 35 is lit up to form each of the light spots SPk and obtain the two-dimensional beam profile of each of the light spots SPk (refer to FIG. 5).

In step S45, subsequent to performing the measurement of all the light spots SPk formed as the constant light quantity in step S44, the first light quantity related data PWk in all the light spots SPk formed as the constant light quantity is found, and the process goes to step S46. In step S45, as described above, the first light quantity related data PW in the light spot SPk is found by using the first threshold Th1 to the measurement result of the light spot SPk as a target formed as the constant light quantity in step S44. In step S45, the first light quantity related data PWk in all the light spots SPk is found by targeting all the light spots SPk each formed as the constant light quantity. Therefore step S45 becomes a first process of finding the first light quantity related data PW showing the magnitude in the light spot SP formed by lighting up the light-emitting unit (LED 35) by the driver IC 36 as the driving unit by using the constant light quantity correction data CDf.

In step S46, subsequent to finding the first light quantity related data PWk in all the light spots SPk each formed as the constant light quantity in step S45, the first magnitude related data BSk in all the light spots SPk each formed as the constant light quantity is found, and the process goes to step S47. In step S46, as described above, the first magnitude related data BS in the light spot SPk is found using the second threshold Th2 to the measurement result in the light spot SPk as a target formed as the constant light quantity in step S44. In step S46, the first magnitude related data BSk in all the light spots SPk is found by targeting all the light spots SPk each formed as the constant light quantity. It should be note that step 46 may be executed at the same time with step S45 or may be executed before step S45, and is not limited to the configuration of the fourth embodiment. This is because any of step S45 and step S46 uses the measurement result in step S44, and one processing content thereof has no influence on the other processing content. Therefore step S46 becomes a second process of finding the first magnitude related data BS showing the magnitude in the light spot SP formed by lighting up the light-emitting unit (LED 35) by using the constant light quantity correction data CDf by the driver IC 36 as the driving unit, by using the second threshold Th2.

In step S47, subsequent to finding the first magnitude related data BSk in all the light spots SPk in step S46, the first ratio related data PDk (first factor) in all the light spots SPk is found, and the process goes to step S48. In step S47, for setting the light quantity correction data, the first ratio data PDk between the first light quantity related data PWk found in step S45 and the first magnitude related data BSk found in step S46 is found to all the light spots SPk each formed as the constant light quantity. That is, in step S47, a value (amount) equivalent to the light power density (light quantity per area) in all the light spots SPk each formed as the constant light quantity is found. In step S47 of the fourth embodiment, as described above, the first ratio data PDk in all the light spots SPk is found as the ratio of the first light quantity related data PWk to the first magnitude related data BSk (PDk=PWk/BSk). Therefore step S47 becomes a third process of finding the first ratio data PD showing the ratio between the first light quantity related data PW and the first magnitude related data BS.

In step S48, subsequent to finding the first ratio data PDk in all the light spots SPk in step S47, the first ratio average value $PD_{ave}$ is found, and the process goes to step S49. In step S48, as described above, an average value of the first ratio data PDk in all the light spots SPk formed as the constant light quantity found in step S47 is found, which is made to the first ratio average value $PD_{ave}$.

In step S49, subsequent to finding the first ratio average value $PD_{ave}$ in step S48, the light quantity correction data CD4$k$ to each of the LEDs 35 is found, and the process goes to step S50. In step S49, the light quantity correction data CD4$k$ to each of the LEDs 35 forming the light spot SPk as a target is found by using the first ratio data PDk (first factor) found in step S47. In step S49 of the fourth embodiment, the light quantity correction data CD4$k$ [%] to each of the LEDs 35 is found by substituting the first ratio data PDk, the first ratio average value $PD_{ave}$ found in step S48 and the constant light quantity correction data CDfk found in step S43 to the aforementioned expression (4). Therefore step S49 becomes a fourth process of finding the light quantity correction data CD4 to the light-emitting unit (LED 35) forming the light spot SP as a target by using the first ratio data PD in all the light spots SPk each formed as the constant light quantity.

In step S50, subsequent to finding the light quantity correction data CD4$k$ to each of the LEDs 35 in step S49, each of the light quantity correction data CD4$k$ is recorded and retained in the print head 30 to complete the processing of setting the light quantity correction data (light quantity correction value). In step S50, each of the light quantity correction data CD4$k$ found in step S49 is recorded and retained in the print head 30 to be capable of being referred to for driving each of the LEDs 35. In step S50 of the fourth embodiment, the light quantity correction data CD4$k$ corresponding to the light spot SPk is stored in the memory 37 (refer to FIG. 1) of the driver IC 36 that drives the LED 35 forming the light spot SPk. Therefore step S50 becomes a fifth process of retaining the found light quantity correction data CD4 to the print head 30.

Figure 15:
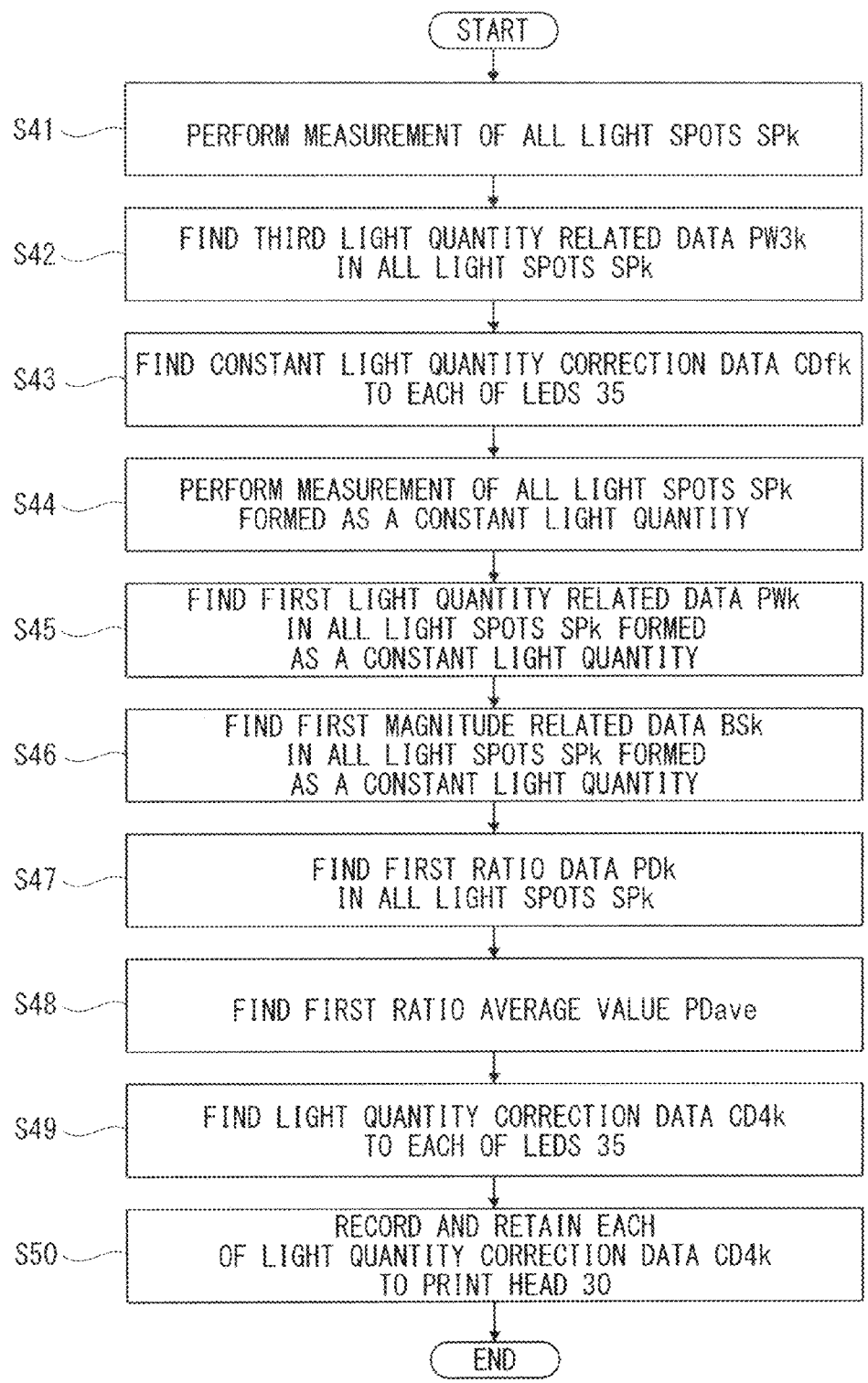
FIG. 15 is a flow chart showing processing of setting light quantity correction data (light quantity correction value) in a method of manufacturing a print head according to a fourth embodiment of the present invention.

In the method of manufacturing the print head according to the fourth embodiment of the present invention, after the print head 30 is assembled as described above, the processing of setting the light quantity correction data (light quantity correction value) is executed (refer to the flow chart in FIG. 15). In the flow chart in FIG. 15, the process goes to step S41, wherein each of the light spots SPk is formed on the field in the assembled print head 30 to measure each of the light spots SPk. After that, in the flow chart in FIG. 15, the process goes in the order of step S42 and step S43, and thereby the third light quantity related data PW3$k$ in all the light spots SPk is found to find the constant light quantity correction data CDfk to each of the LEDs 35 forming the light spots SPk. In the flow chart in FIG. 15, the process goes to step S44, wherein each of the light spots SPk is formed on the field using the constant light quantity correction data CDfk by the print head 30 to be measured. After that, in the flow chart in FIG. 15, the process goes in the order of step S45, step S46 and step S47, and thereby the first ratio data PDk (first factor) as the ratio between the light quantity (or value closely related to the light quantity) and the magnitude in the light spot SPk formed as the constant light quantity is found by using the first light quantity related data PWk and the first magnitude related data BSk. In addition, in the flow chart in FIG. 15, the process goes to step S48 and then, step S49, and thereby the light quantity correction data CD4$k$ to each of the LEDs 35 forming the light spot SPk is found by using the first ratio data PDk (first factor) in the light spot SPk as a target formed as the constant light quantity. After that, in the flow chart in FIG. 15, the process goes to step S50, wherein the light quantity correction data CD4$k$ found corresponding to the light spot SPk formed by the LED 35 is stored in the memory 37 of the driver IC 36 driving each of the LEDs 35.

As a result, the method of manufacturing the print head according to the fourth embodiment of the present invention can manufacture the print head 30 in which the light quantity correction data CD4$k$ set as described above is stored in the memory 37 of each of the drivers IC 36 corresponding to each of the LEDs 35. Therefore in the print head 30 formed by the method of manufacturing the print head according to the fourth embodiment, each of the drivers IC 36 drives each of the LEDs 35 by using the light quantity correction data CD4$k$ set as described above and stored in the memory 37 (refer to FIG. 1). Therefore, the print head 30 formed by the method of manufacturing the print head according to the fourth embodiment can appropriately prevent the generation of the longitudinal streak in the formed image. This is achieved by the following configuration.

A change in luminosity of the image formed by driving each of the LEDs 35 using the light quantity correction data is basically substantially in proportion to a change in the light quantity correction data, that is, changes in a changing rate substantially equal thereto. In the image, however, when a changing amount of the light quantity correction data becomes large, there are some cases where the change in luminosity deviates from a relationship of being substantially in proportion to the change in the light quantity correction data. In such a case, in the print head 30 using the light quantity correction data, there is a possibility that the effect of preventing the generation of the longitudinal streak (density unevenness) on the image deteriorates.

On the other hand, in the method of manufacturing the print head according to the fourth embodiment, the light quantity is made constant by using the constant light quantity correction data CDf found before to form the light spot SP, and the light quantity correction data CD4 is found from the light spot SP. By thus forming the light spot SP as the constant light quantity, it is possible to suppress the generation of the longitudinal streak (density unevenness) on the image to be formed thereby, thus making the rough correction. When the rough correction is made to find the light quantity correction data CD4 from the light spot SP in which the generation of the longitudinal streak (density unevenness) is suppressed, the change in luminosity of the formed image can be substantially in proportion to the change in the light quantity correction data CD4 regardless of the magnitude in the changing amount. In the method of manufacturing the print head according to the fourth embodiment, the light quantity correction data CD4 is stored in the memory 37 to manufacture the print head 30. Therefore in the print head 30, each of the LEDs 35 is driven by using the light quantity correction data CD4 stored in the memory 37, and thereby the developing toner amount to be determined depending upon the light power density can be more finely adjusted to more appropriately prevent the generation of the longitudinal streak (density unevenness) on the image.

Since the method of manufacturing the print head according to the fourth embodiment basically has the same configuration with the method of manufacturing the print head according to the first embodiment, it can basically obtain the effect similar to that of the first embodiment.

In addition thereto, in the method of manufacturing the print head according to the fourth embodiment, the light spot SP the light quantity of which is made constant is formed by using the constant light quantity correction data CDfk found before, and the light quantity correction data CD4 is found using the ratio between the light quantity (value closely related to the light quantity) and the magnitude in the light spot SP. Therefore in the method of manufacturing the print head, it is possible to more appropriately find the light power density in the light from each of the LEDs 35 to set the light quantity correction data CD4$k$ with the more appropriate light power density. In the light quantity correction data CD4$k$, even in a case where the changing amount becomes large, the change in luminosity of the formed image can be substantially in proportion to the change in the light quantity correction data CD4$k$. As a result, the method of manufacturing the print head can set the light quantity correction data CD4$k$ that can more finely adjust the developing toner amount regardless of the changing amount. Accordingly, in the method of manufacturing the print head, the set light quantity correction data CD4$k$ is used to correct the light quantity of the light emitted from each of the light sources (each of the LEDs 35), and thereby it is possible to manufacture the print head 30 that more appropriately prevents the generation of the longitudinal streak (density unevenness).

In addition, in the method of manufacturing the print head according to the fourth embodiment, the light quantity correction data CD4$k$ is set using the constant light quantity correction data CDfk used to make the light quantity of the light spot SP formed before constant in addition to the first ratio data PDk (first factor). Therefore it is possible to more appropriately find the light power density in the light from each of the LEDs 35 to set the light quantity correction data CD4$k$ with the more appropriate light power density. As a result, the method of manufacturing the print head can set the light quantity correction data CD4$k$ that can more finely adjust the developing toner amount regardless of the changing amount. Accordingly, in the method of manufacturing the print head, the set light quantity correction data CD4$k$ is used to correct the light quantity of the light emitted from each of the light sources (each of the LEDs 35), and thereby it is possible to manufacture the print head 30 that more appropriately prevents the generation of the longitudinal streak (density unevenness).

Accordingly, the method of manufacturing the print head according to the fourth embodiment of the present invention can manufacture the print head 30 that can appropriately prevent the generation of the longitudinal streak.

It should be noted that in the method of manufacturing the print head according to the fourth embodiment, the first item using the first ratio data PD (first factor) and the second item using the constant light quantity correction data CDfk (second factor) are added in the expression (4) of finding the light quantity correction data CD4$k$. However, in the method of manufacturing the print head, use of the first ratio data PDk (first factor) as the ratio of the light quantity and the magnitude in the light spot SP formed by each of the light sources (each of the LEDs 35) is only required, and the method of finding the light quantity correction data CD4$k$ is not limited to the configuration of the fourth embodiment. An example of this may include a method of multiplying the first item using the first ratio data PD (first factor) by the second item using the constant light quantity correction data CDfk (second factor). In addition, the other example may include a method of using only the first ratio data PD as the first factor without using the constant light quantity correction data CDfk (second factor). The further other example thereof may include a combination of the first item and the second item according to a different expression or a change in use of the first ratio data PDk (first factor) or the constant light quantity correction data CDfk (second factor).

In addition, in the method of manufacturing the print head according to the fourth embodiment, the constant light quantity data correction CDf is found to make the light quantity in the light spot SP accurately constant, but in a case of being capable of suppressing the generation of the longitudinal streak (density unevenness) formed by each of the light spots SP, the constant light quantity correction data CDf may be made to make a difference in light quantity between the light spots SP small, and is not limited to the configuration of the fourth embodiment.

It should be noted that in each of the embodiments described above, the method of manufacturing the print head is explained as an example of the method of manufacturing the print head according to the present invention, but the present invention is not limited to each of the embodiments explained above and may be provided as a method of manufacturing a print head that includes a substrate on which a plurality of light-emitting units are provided to be arrayed, and a driving unit that drives each of the light-emitting units, wherein a light spot is formed on a field by each of the light-emitting units, comprising a first step of finding first light quantity related data showing a light quantity in the light spot formed by lighting up the light-emitting unit by the driving unit by using a first threshold, a second step of finding first magnitude related data showing a magnitude in the light spot formed by lighting up the light-emitting unit by the driving unit by using a second threshold, a third step of finding first ratio data showing a ratio between the first light quantity related data and the first magnitude related data, a fourth step of finding light quantity correction data to the light-emitting unit forming the light spot as a target by using the first ratio data, and a fifth step of retaining the found light quantity correction data to the print head.

Further, in each of the embodiments described above, one light spot SP is formed by lighting up one LED 35, and thereafter, each of the light spot SP formed in this way is measured. However, the print head 30 may be configured such that the plurality of sequential LEDs 35 out of the LEDs 35 lining up in line are lit up simultaneously to form one light spot (SP), and each of the light spot (SP) formed in this way is measured. In this case, the number of the LEDs 35 that are lit up simultaneously is made constant during a period where the light spots are measured while targeting the same print head 30.

In addition, each of the embodiments described above adopts the print head 30, but the print head in the present invention may be a print head that forms light spots (light spots SP in each of the embodiments) on a field by driving a plurality of light sources (LEDs 35 in each of the embodiments) arrayed in line and retains the light quantity correction data found by the method of manufacturing the print head according to the present invention, and is not limited to the configuration of each of the embodiments described above.

Each of the embodiments described above adopts the image forming apparatus 10 composed of the multicolor printer of the tandem system that forms a full color image, but the image forming apparatus according to the present invention may be an image forming apparatus including the print head (30) manufactured by the method of manufacturing the print head according to the present invention, the image bearer (photoconductor 11) on which the electrostatic latent image is formed thereby, the developing device 13 for developing the electrostatic latent image to a visible image, and the transfer mechanism (transfer roller 19) for transferring the visible image on the image bearer on the recording medium P, and is not limited to the configuration of each of the embodiments described above.

In the aforementioned fourth embodiment, the light quantity is corrected to be constant before the first process (step S2) in the processing of setting the light quantity correction data (light quantity correction value) in the first embodiment. However, in the method of manufacturing the print head according to the present invention, the correction of making the light quantity constant may be made before finding the first ratio data PD, that is, the first light quantity related data PW and the first magnitude related data BS, wherein all the light spots SPk formed as the constant light quantity are measured, the first light quantity related data PW and the first magnitude related data BS are found, and therefrom, the first ratio related data PD is found. Thus the other configuration (process) may be adopted, and the setting processing is not limited to the configuration of the fourth embodiment described above. The other configuration (process) may include an example where the light quantity is corrected to be constant before the first process (step S12) in the processing of setting the light quantity correction data (light quantity correction value) in the second embodiment (flow chart in FIG. 13) or an example where the light quantity is corrected to be constant before the first process (step S22) in the processing of setting the light quantity correction data (light quantity correction value) in the third embodiment (flow chart in FIG. 14).

In the above-mentioned, the method of manufacturing the print head according to the present invention, the print head manufactured based thereupon and the image forming apparatus provided therewith are explained based upon each of the embodiments, but each specific configuration thereof is not limited to each of the embodiments, and is permitted in a modification in design, additions and the like within the scope not departing from the subject of the present invention.

What is claimed is:

1. A method of manufacturing a print head that includes a substrate on which a plurality of light-emitting units are provided to be arrayed, and a driver that drives each of the light-emitting units, wherein a light spot is formed on a field by each of the light-emitting units, comprising:
   a first step of finding first light quantity related data of a light quantity in the light spot formed by lighting up the light-emitting unit by the driver by using a first threshold;
   a second step of finding first magnitude related data of a magnitude in the light spot, formed by lighting up the light-emitting unit by the driver by using a second threshold;
   a third step of finding first ratio data of a ratio between the first light quantity related data and the first magnitude related data; and
   a fourth step of providing light quantity correction data to the light-emitting unit forming the light spot by using the first ratio data, and
   a fifth step of retaining the provided light quantity correction data at the print head, whereby the retained light quantity correction data may be used to correct a light quantity emitted by the light-emitting units.

2. The method of manufacturing the print head according to claim 1, wherein the first magnitude related data is found based upon a diameter dimension in the light spot.

3. The method of manufacturing the print head according to claim 1, wherein the first magnitude related data is found based upon diameter dimensions in the light spot as viewed in two different directions.

4. The method of manufacturing the print head according to claim 1, wherein the first magnitude related data is found based upon an area of the light spot.

5. The method of manufacturing the print head according to claim 1, wherein
   at least one of the first step of further finding second light quantity related data of a light quantity in the light spot formed by lighting up the light-emitting unit by the driver by using a third threshold different from the first threshold, and the second step of further finding second magnitude related data of a light quantity in the light spot formed by lighting up the light-emitting unit by the driver by using a fourth threshold different from the second threshold, is executed, and
   in the fourth step, the first ratio data and at least one of the second light quantity related data and the second magnitude related data are used to provide the light quantity correction data to the light-emitting unit forming the light spot as a target.

6. The method of manufacturing the print head according to claim 5, wherein
   in the first step, the first threshold is used to find the first light quantity related data and the third threshold is used to find the second light quantity related data,
   in the second step, the second threshold is used to find the first magnitude related data and the fourth threshold is used to find the second magnitude related data,
   in the third step, the first ratio data is found from the first light quantity related data and the first magnitude related data, and second ratio data of a ratio between the second light quantity related data and the second magnitude related data is found, and
   in the fourth step, the first ratio data and the second ratio data are used to provide the light quantity correction data to the light-emitting unit forming the light spot as a target.

7. The method of manufacturing the print head according to claim 1, wherein at least one of the light quantity related data and the magnitude related data is found by executing averaging processing using at least one of the plurality of light quantity related data and the plurality of magnitude related data found from the plurality of sequential light spots.

8. The method of manufacturing the print head according to claim 1, further comprising:
   a sixth step of finding third light quantity related data showing a light quantity in the light spot formed by lighting up the light-emitting unit by the driver by using a further threshold; and
   a seventh step of providing constant light quantity correction data to the light-emitting unit to make the third light quantity related data in the light spot constant, before the first step,
   wherein in the first step and the second step, the driver forms the light spot by lighting up the light-emitting unit by using the constant light quantity correction data.

9. A print head that is manufactured by the method of manufacturing the print head according to claim 1 and includes the substrate, the driver, each of the light-emitting units, and a lens array to make light from each of the light-emitting units the light spot on a field, comprising:
   a memory unit that stores data which is used to drive each of the light-emitting units, wherein the light quantity correction data is stored in the memory to retain the light quantity correction data.

10. An image forming apparatus comprising:
   the print head according to claim 9;
   an image bearer on which an electrostatic latent image is formed by forming the light spot by the print head;
   a developing device to form the electrostatic latent image into a visible image; and
   a transfer mechanism to transfer the visible image on the image bearer, on a recording medium.

* * * * *